US010106418B2

(12) United States Patent
Pauzauskie et al.

(10) Patent No.: US 10,106,418 B2
(45) Date of Patent: *Oct. 23, 2018

(54) GRAPHENE AEROGELS

(71) Applicant: Lawrence Livermore National Security, LLC, Livermore, CA (US)

(72) Inventors: Peter J. Pauzauskie, Oakland, CA (US); Marcus A. Worsley, Hayward, CA (US); Theodore F. Baumann, Discovery Bay, CA (US); Joe H. Satcher, Jr., Patterson, CA (US); Juergen Biener, San Leandro, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 676 days.

This patent is subject to a terminal disclaimer.

(21) Appl. No.: 14/606,894

(22) Filed: Jan. 27, 2015

(65) Prior Publication Data
US 2015/0175425 A1 Jun. 25, 2015

Related U.S. Application Data

(62) Division of application No. 13/204,277, filed on Aug. 5, 2011, now Pat. No. 8,993,113.
(Continued)

(51) Int. Cl.
*C01B 32/00* (2017.01)
*C01B 31/04* (2006.01)
*B82Y 30/00* (2011.01)
*B82Y 40/00* (2011.01)
*C01B 32/184* (2017.01)
(Continued)

(52) U.S. Cl.
CPC .......... *C01B 31/0446* (2013.01); *B82Y 30/00* (2013.01); *B82Y 40/00* (2013.01); *C01B 32/00* (2017.08); *C01B 32/184* (2017.08); *C01B 32/194* (2017.08); *C01B 32/336* (2017.08); *C01P 2006/12* (2013.01);
(Continued)

(58) Field of Classification Search
CPC ..... C01B 31/0446; C01B 31/00; C01B 32/00; C01B 32/336; C01B 32/194; C01B 32/184; Y10T 428/268; Y10T 428/30; Y10S 977/842; Y10S 977/734; C01P 2006/12
USPC .............. 516/98; 977/734, 842; 428/30, 268
See application file for complete search history.

(56) References Cited

U.S. PATENT DOCUMENTS 5,207,814 A 5/1993 Cogliati
5,879,744 A 3/1999 Cao
(Continued)

OTHER PUBLICATIONS

Worsley et al., "Synthesis and Characterization of Monolithic Carbon Aerogel Nanocomposites Containing Double-Walled Carbon Nanotubes", Langmuir 2008, 24, 9763-9766.*
(Continued)

*Primary Examiner* — Daniel S Metzmaier
(74) *Attorney, Agent, or Firm* — Foley & Lardner, LLP

(57) ABSTRACT

Graphene aerogels with high conductivity and surface areas including a method for making a graphene aerogel, including the following steps: (1) preparing a reaction mixture comprising a graphene oxide suspension and at least one catalyst; (2) curing the reaction mixture to produce a wet gel; (3) drying the wet gel to produce a dry gel; and (4) pyrolyzing the dry gel to produce a graphene aerogel. Applications include electrical energy storage including batteries and supercapacitors.

14 Claims, 31 Drawing Sheets

Related U.S. Application Data

(60) Provisional application No. 61/371,442, filed on Aug. 6, 2010, provisional application No. 61/466,530, filed on Mar. 23, 2011.

(51) Int. Cl.
   C01B 32/194 (2017.01)
   C01B 32/336 (2017.01)
(52) U.S. Cl.
   CPC ........ *Y10S 977/734* (2013.01); *Y10S 977/842* (2013.01); *Y10T 428/268* (2015.01); *Y10T 428/30* (2015.01)

(56) References Cited

U.S. PATENT DOCUMENTS

| | | | |
|---|---|---|---|
| 5,885,953 A | 3/1999 | Jadesjo | |
| 6,492,014 B1* | 12/2002 | Rolison | B01J 13/0091 423/338 |
| 7,378,188 B2 | 5/2008 | Struthers | |
| 7,410,718 B2 | 8/2008 | Cooper | |
| 7,811,711 B2 | 10/2010 | Cooper | |
| 8,480,930 B2* | 7/2013 | Suh | B01J 13/0091 252/502 |
| 8,993,113 B2* | 3/2015 | Pauzauskie | B82Y 30/00 423/448 |
| 9,346,680 B2* | 5/2016 | Liu | B82Y 30/00 |
| 2009/0117467 A1* | 5/2009 | Zhamu | H01M 4/133 429/231.8 |
| 2010/0144904 A1 | 6/2010 | Wang | |
| 2010/0187484 A1 | 7/2010 | Worsley | |
| 2010/0310847 A1* | 12/2010 | Suh | B01J 13/0091 428/220 |
| 2011/0051316 A1* | 3/2011 | Liu | B82Y 30/00 361/502 |
| 2011/0224376 A1 | 9/2011 | Zhai et al. | |
| 2012/0034442 A1 | 2/2012 | Pauzauskie | |
| 2012/0116094 A1* | 5/2012 | Swager | A24D 3/163 548/256 |
| 2014/0178289 A1* | 6/2014 | Worsley | H01B 1/04 423/448 |
| 2014/0178759 A1* | 6/2014 | Worsley | H01M 4/131 429/220 |
| 2015/0122800 A1* | 5/2015 | Gallastegui | C01B 31/043 219/553 |
| 2016/0101398 A1* | 4/2016 | Worsley | B01J 13/0091 106/122 |
| 2016/0355402 A1* | 12/2016 | Mitra | C01B 31/086 |
| 2017/0036915 A1* | 2/2017 | Worsley | C01B 31/0446 |
| 2017/0054137 A1* | 2/2017 | Worsley | H01M 4/0416 |

OTHER PUBLICATIONS

Shao et al., "Electrocapillary maximum and potential of zero charge of carbon aerogel", Phys. Chem. Chem. Phys., 2010, 12, 7580-7587 (published on the web Jun. 3, 2010).*
U.S. Appl. No. 13/204,277, filed Aug. 5, 2011, Pauzauskie et al.
Al-Muhtaseb, S.A. et al. (2003) "Preparation and properties of resorcinol-Formaldehyde organic and carbon gels," Advanced Materials 15(2):101-114.
Arora, P. et al. (1998) "Capacity Fade Mechanisms and Side Reactions in Lithium-Ion Batteries," J. Electroshem. Soc. 145(10):3647-3667.
Balandin, A.A. et al. (2008) "Superior Thermal Conductivity of Single-Layer Graphene", Nano Letters 8(3):902-907.
Baldan, M.R. et al. (2007) "Raman validity for crystallite size $L_a$ determination on reticulated vitreous carbon with different graphitization index," Applied Surface Science 254:600-603.
Batson, P.E. (1993) "Carbon 1s near-edge-absorption fine structure in graphite," Physical Review B 48(4):2608-2610.
Baumann, T.F. et al. (2005) "Facile Synthesis of a Crystalline, High-Surface-Area $SnO_2$ Aerogel," Advanced Materials 17:1546-1548.
Biener, J. et al. (2011) "Advanced carbon aerogels for energy applications," Energy & Environmental Science 4:656-667.
Chen, W. et al. (2011) "In situ self-assembly of mild chemical reduction graphene for three-dimensional architectures," Nanoscale 3:3132-3137.
Chen, Z. et al. (2011) "Three-dimensional flexible and conductive interconnected grapheme networks grown by chemical vapour deposition," Nature Materials 10:424-428.
Cote, L.J. et al. (2009) "Flash Reduction and Patterning of Graphite Oxide and Its Polymer Composite," J. Am. Chem. Soc. 131:11027-11032.
Eda, G. et al. (2008) "Large-area ultrathin films of reduced graphene oxide as a transparent and flexible electronic material," Nature Nanotechnology 3:270-274.
Ferrari, A.C. et al. (2000) "Interpretation of Raman spectra of disordered and amorphous carbon," Physical Review B 61(20):14095-14107.
Ferrari, A.C. et al. (2006) "Raman Spectrum of Graphene and Graphene Layers," PRL 97:187401-1-187401-4.
Fowler, J.D. et al. (2009) "Practical Chemical Sensors from Chemically Deprived Graphene," ACS Nano 3(2):301-306.
Gash, A.E. et al. (2003) "Strong Akaganeite Aerogel Monoliths Using Epoxides: Synthesis and Characterization," Chem. Mater. 15:3268-3275.
Geim, A.K. et al. (2007) "The rise of graphene," Nature Materials 6:183-191.
Ghosh, S. et al. (2008) "Extremely high thermal conductivity of graphene: Prospects for thermal management applications in nanoelectronic circuits," Applied Physics Letters 92:151911-1-151911-3.
Gomez-Navarro, C. et al. (2007) "Electronic Transport Properties of Individual Chemically Reduced Grapheme Oxide Sheets," Nano Letters 7(11):3499-3503.
Graf, D. et al. (2007) "Spatially Resolved Raman Spectroscopy of Single- and Few-Layer Graphene," Nano Letters 7(2):238-242.
Gregg, S.J. et al. (1982) "Adsorption, Surface Area and Porosity," Second Edition, Academic Press:cover and table of contents.
Ha, D-H. et al. (2012) "Binder-Free and Carbon-Free Nanoparticle Batteries: A Method for Nanoparticle Electrodes without Polymeric Binders or Carbon Black," Nano Letters 12:5122-5130.
Huang, J.Y. et al. (2010) "In Situ Observation of the Electrochemical Lithiation of a Single $SnO_2$ Nanowire Electrode," Science 330:1515-1520.
Hummers, W.S., Jr. et al. (1958) "Preparation of Graphitic Oxide," Contribution from the Baroid Graphitic Oxide:1339.
Hwang, E.H. et al. (2007) "Carrier Transport in Two-Dimensional Graphene Layers," Physical Review Letters 98:186806-1-186806-4.
Iler, R.K. (1979) "The Chemistry of Silica: Solubility, Polymerization, Colloid and Surface Properties and Biochemistry of Silica," ISBN:9780471024040, cover and table of contents.
Jain, G. et al. (2006) "Structural Studies of Lithium Intercalation in a Nanocrystalline $\alpha$-$Fe_2O_3$ Compound," Chem. Materials 18:423-434.
Jeong, H-K. et al. (2008) "X-ray absorption spectroscopy of graphite oxide," EPL 82:67004-p. 1-67004-p. 5.
Jeong, H-K. et al. (2009) "Comment on 'Near-Edge X-Ray Absorption Fine-Structure Investigation of Graphene'," PRL 102:099701-1.
Kucheyev, S.O. et al. (2009) "Depth-sensing indentation of low-density brittle nanoporous solids," Acta Materialia 57:3472-3480.
Kuhn, J. et al. (1998) "In situ infrared observation of the pyrolysis process of carbon aerogels," Journal of Non-Crystalline Solids 225:58-63.
Larcher, D. et al. (2003) "Combined XRD, EXAFS, and Mossbauer Studies of the Reduction by Lithium of $\alpha$-$Fe_2O_3$ with various particle sizes," Journal of Electrochemical Society 150(12):A1643-A1650.
Laruelle, S. et al. (2002) "On the Origin of the Extra Electrochemical Capacity Displayed by Mo/Li Cells at Low Potential," Journal of the Electrochemical Society 149(5):A627-A634.

(56) References Cited

OTHER PUBLICATIONS

Lee, C. et al. (2008) "Measurement of the elastic properties and intrinsic strength of monolayer grapheme", Science 321:385-388.
Li, X. et al. (2008) "Highly conducting graphene sheets and Langmuir-Blodgett films," Nature Nanotechnology 3:538-542.
Liu, F. et al. (2010) "A Controllable Self-Assembly Method for Larger-Scale Synthesis of Graphene Sponges and Free-Standing Graphene Films," Advanced Functional Materials 20:1930-1936.
Lu, X. et al. (1993) "Thermal and electrical conductivity of monolithic carbon aerogels," Journal of Applied Physics 73:581-584.
Ma, Y. et al. (1993) "Core Excitons and Vibronic Coupling in Diamond and Graphite," Physical Review Letters, vol. 71, No. 22, 3725-3728, (1993).
McAllister, M.J. et al. (2007) "Single Sheet Functionalized Graphene by Oxidation and Thermal Expansion of Graphite," Chem. Mater. 19:4396-4404.
Morales, J. et al. (2005) "Synthesis and Characterization of Nanometric Iron and Iron-Titanium Oxides by Mechanical Milling: Electrochemical Properties as Anodic Materials in Lithium Cells," Journal of the Electrochemical Society 152(9):A1748-A1754.
Morozov, S.V. et al. (2008) "Giant Intrinsic Carrier Mobilities in Graphene and Its Bilayer," Physical Review Letters 100:016602-1-016602-4.
Novoselov, K.S. et al. (2004) "Electric Field Effect in Atomically Thin Carbon Films," Science 306: 666-669.
Oliver, W.C. et al. (1992) "An improved technique for determining hardness and elastic modulus using load and displacement sensing indentation experiments," J. Mater. Res. 7(6):1564-1583.
Pacile, D. et al. (2008) "Near-Edge X-Ray Absorption Fine-Structure Investigation of Graphene", Physical Review Letters 101:066806-1-066806-4.
Pacile, D. et al. (2009) "Reply to comment on 'Near-Edge X-Ray Absorption Fine-Structure Investigation of Graphene'," Physical Review Letters 102:099702.
Peigney, A. et al. (2001) "Specific surface area of carbon nanotubes and bundles of carbon nanotubes," Carbon 39:507-514.
Pekala, R.W. et al. (1989) "Resorcinol-Formaldehyde Aerogels and their Carbonized Derivatives," Abstracts of Papers of the American Chemical Society 197:113.
Peled, E. (1983) "3. Lithium Stability and Film Formation in Organic and Inorganic Electrolyte for Lithium Battery Systems," Lithium Batteries:43-72.
Poizot, P. et al. (2000) "Nano-sized transition-metal oxides as negative-electrode materials for lithium-ion batteries," Nature 407:496-499.
Ramanathan, T. et al. (2008) "Functionalized graphene sheets for polymer nanocomposites," Nature Nanotechnology 3:327-331.
Schedin, F. et al. (2007) "Detection of individual gas molecules adsorbed on graphene," Nature Materials 6:652-655.
Shao, Y. et al. (2010) "Graphene Based Electrochemical Sensors and Biosensors: A Review," Electroanalysis 22(10):1027-1036.
Stankovich, S. et al. (2006) "Graphene-based composite materials," Nature Letters 442:282-286.
Stohr, J. (1992) Nexafs Spectroscopy; Spinger-Verlag: Berlin—Heidelberg—New York:cover and table of contents.
Sutter, P.W. et al. (2008) "Epitaxial graphene on ruthenium," Nature Materials 7:406-411.
Takai, K. et al. (2003) "Structure and electronic properties of a nongraphitic disordered carbon system and its heat-treatment effects," Physical Review B 67:214202-1-214202-11.
Tang, Z. et al. (2010) "Noble-Metal-Promoted Three-Dimensional Macroassembly of Single-Layered Graphene Oxide," Angew. Chem. 49:4603-4607.
Verdejo, R. et al. (2008) "Functionalized graphene sheet filled silicone foam nanocomposites," Journal of Materials Chemistry 18:2221-2226.
Vickery, J.L. et al. (2009) "Fabrication of graphene-polymer nanocomposites with higher-order three-dimensional architectures," Advanced Materials 21:2180-2184.

Vivekchand, S.R.C. et al. (2008) "Graphene-based electrochemical supercapacitors," J. Chem. Sci. 120(1):9-13.
Vollmer, A. et al. (2009) "Electronic and structural properties of graphene-based transparent and conductive thin film electrodes," Appl. Phys. A 94:1-4.
Wang, D. et al. (2010) "Ternary Self-Assembly of Ordered Metal Oxide-Graphene Nanocomposites for Electrochemical Energy Storage," ASC Nano 4(3):1587-1595.
Wang, H. et al. (2010) "$Mn_3O_4$-Graphene Hybrid as a High-Capacity Anode Material for Lithium Ion Batteries," J. Am. Chem. Soc. 132:13978-13980.
Wang, J. et al. (2009) "Graphene Aerogels," ECS Transactions 19(5):241-247.
Wang, X. et al. (2008) "Transparent, Conductive Graphene Electrodes for Dye-Sensitized Solar Cells," Nano Letters 8(1):323-327.
Worsley, M.A. et al. (2009) "High surface area carbon nanotube-supported titanium carbonitride aerogels," Journal of Materials Chemistry 19:5503-5506.
Worsley, M.A. et al. (2009) "Mechanically robust and electrically conductive carbon nanotube foams," Applied Physics Letters 94:073115-1-073115-3.
Worsley, M.A. et al. (2009) "Properties of single-walled carbon nanotube-based aerogels as a function of nanotube loading," Acta Materialia 57:5131-5136.
Worsley, M.A. et al. (2009) "Stiff and electrically conductive composites of carbon nanotube aerogels and polymers," Journal of Materials Chemistry 19:3370-3372.
Worsley, M.A. et al. (2010) "Synthesis of Graphene Aerogel with High Electrical Conductivity," JACS Communications 132:14067-14069.
Worsley, M.A. et al. (2011) "Carbon Scaffolds for Stiff and Highly Conductive Monolithic Oxide-Carbon Nanotube Composites," Chemistry of Materials 23:3054-3061.
Worsley, M.A. et al. (2011) "High Surface Area, $sp^2$-Cross-Linked Three-Dimensional Graphene Monoliths," The Journal of Physical Chemistry Letters 2:921-925.
Worsley, M.A. et al. (2012) "Mechanically Robust 3D Graphene Macroassembly with High Surface Area," Electronic Supplementary Material (ESI) for Chemical Communications:1-6.
Worsley, M.A. et al. (2012) "Mechanically Robust 3D Graphene Macroassembly with high surface area," Chemical Communications 48:8428-8430.
Wu, Z-S. et al. (2010) "Graphene Anchored with $Co_3O_4$ Nanoparticles as Anode of Lithium Ion Batteries with Enhanced Reversible Capacity and Cyclic Performance," 4(6):3187-3194.
Wu, Z-S. et al. (2009) "Synthesis of Graphene Sheets with High Electrical Conductivity and Good Thermal Stability by Hydrogen Arc Discharge Exfoliation," 3(2):411-417.
Xu, Y. et al. (2010) "Self-Assembled Graphene Hydrogel via a One-Step Hydrothermal Process," ACS Nano 4(7):4324-4330.
Yin, S. et al. (2012) "Assembly of Graphene Sheets into 3D Macroscopic Structures," Small 8(16):2458-2463.
Yoo, E.J. et al. (2008) "Large Reversible Li Storage of Graphene Nanosheet Families for Use in Rechargeable Lithium Ion Batteries," Nano Letters 8(8):2277-2282.
Zhou, G. et al. (2010) "Graphene-Wrapped $Fe_3O_4$ Anode Material with Improved Reversible Capacity and Cyclic Stability for Lithium Ion Batteries," Chem. Mater. 22:5306-5313.
Zhu, X. et al. (2011) "Nanostructured reduced graphene oxide/$Fe_2O_3$ composite as a high-performance anode material for lithium ion batteries," ACS Nano 5(4):3333-3338.
Zu, S-Z. et al. (2009) "Aqueous Dispersion of Graphene Sheets Stabilized by Pluronic Copolymers: Formation of Supramolecular Hydrogel," J. Phys. Chem. C 113:13651-13657.
Restriction Requirement for U.S. Appl. No. 13/204,277, dated Apr. 26, 2012, 7 pages.
Non-Final Office Action for U.S. Appl. No. 13/204,277, dated Oct. 11, 2012, 12 pages.
Final Office Action for U.S. Appl. No. 13/204,277, dated Mar. 13, 2013, 14 pages.
Non-Final Office Action for U.S. Appl. No. 13/204,277, dated Jun. 5, 2014, 13 pages.

(56) References Cited

OTHER PUBLICATIONS

Notice of Allowance for U.S. Appl. No. 13/204,277, dated Dec. 16, 2014, 7 pages.

\* cited by examiner

FIGURE 20

| Material | ρ (g/cm$^3$) | $S_{BET}$ (m$^2$/g) | Capacitance (F/g) | Capacitance (μF/cm$^2$) |
|---|---|---|---|---|
| CA | 0.550 | 450 | 50 | 11.1 |
| ACA | 0.100 | 3289 | 100 | 3.0 |
| Graphene-CA | 0.430 | 754 | 72 | 9.5 |
| Graphene-ACA | 0.082 | 3093 | 242 | 7.8 |

2.5 M NaCl

FIGURE 23

| Material | Capacitance (F/g) | RC time (s) | Energy density (W*hr/kg) | Max delivered power density (kW/kg) |
|---|---|---|---|---|
| Ref. EDLC | 100-200 | 0.1-1 | 5 | 5-10 |
| Graphene Aerogel | 123 | 0.04 | 4.3 | 193 |

Unactivated 750m²/g $\xrightarrow{950°C, CO2}$ Activated 3100m²/g

FIGURE 26

| Act. Time (h) | Mass Loss | BET SA (m²/g) |
|---|---|---|
| – | – | 400 |
| 2 | 43% | ~1500 |
| 3 | 60% | ~2300 |
| 4 | 70% | ~2450 |
| 5 | 75% | ~2800 |
| 6 | 85% | ~3200 |

2.5 M NaCl

FIGURE 29

| Material | Capacitance (F/g) | RC time (s) | Energy density (W*hr/kg) | Max delivered power density (kW/kg) |
|---|---|---|---|---|
| CA | 65 | 0.5 | 2.9 | 6.6 |
| ACA | 129 | 0.03 | 4.5 | 289 |
| Graphene-CA | 70.1 | 0.1 | 2.4 | 43 |
| Graphene-ACA | 243 | 0.03 | 8.4 | 489 |

GRAPHENE AEROGELS

RELATED APPLICATIONS

This application is a divisional application of U.S. application Ser. No. 13/204,277 filed Aug. 5, 2011, which claims priority to US provisional applications U.S. Ser. Nos. 61/371,442 filed Aug. 6, 2010, and 61/466,530 filed Mar. 23, 2011, which are each incorporated herein by reference in their entireties for all purposes.

FEDERAL FUNDING STATEMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Graphene is a two-dimensional (2D) structure of carbon atoms with unique electronic, chemical, and mechanical properties [1-5]. Extensive research has shown the potential of graphene or graphene-based sheets to impact a wide range of technologies including energy storage [6-10], catalysis [11-12], sensing [13-15], and composites [16-20]. Developing three-dimensional (3D) structures with this extraordinary nanomaterial would further expand its significance both in the number of applications and in the manufacturability of devices. However, literature on the assembly of 3D graphene structures is limited [12, 20-24]. Typically, previous reports relied on the high stability of graphene oxide (GO) suspensions to assemble an initial GO macrostructure, which is then thermally reduced to yield the 3D graphene network. These reports indicated that physical crosslinks (e.g. Van der Waals forces) hold the 3D graphene networks together and, as a result, bulk electrical conductivities of these assemblies only reach approximately $5 \times 10^{-1}$ S/m [23]. Even when metal crosslinks are used between graphene sheets instead of weak physical bonds, electrical conductivities of only $2.5 \times 10^{-1}$ S/m were reached [12]. These numbers are several orders of magnitude below the conductivity reported for graphene sheets (about $8 \times 10^3$ S/m) produced by thermal reduction of GO [25]. Clearly, a need exists to improve 3D graphene macroassemblies.

SUMMARY

Embodiments provided herein include compositions, devices, and articles, as well as methods of making and methods of using the compositions, devices, and articles.

For example, one embodiment provides a composition comprising at least one three-dimensional structure of graphene sheets, wherein the graphene sheets are crosslinked by covalent carbon bonds.

In one embodiment, the atomic oxygen content is 5% or less.

In one embodiment, the graphene sheets are randomly oriented.

In one embodiment, the sheets have lateral dimensions of at least 200 nm.

In one embodiment, the graphene sheet surfaces are substantially free of carbon nanoparticles.

In one embodiment, the composition is mesoporous.

In one embodiment, the composition has a peak pore diameter of about 2 nm to about 50 nm.

In one embodiment, the covalent carbon bonds for crosslinking the graphene sheets are primarily $sp^2$ bonds.

In one embodiment, the composition comprises a monolith.

In one embodiment, the composition has a surface area of 500 $m^2$/g or more and has an electrical conductivity of 20 S/m or more.

In addition, another embodiment provides a composition comprising at least one graphene aerogel monolith, wherein the monolith has an electrical conductivity of at least about 25 S/m.

In one embodiment, the monolith comprises graphene sheets which are crosslinked by carbon covalent bonds.

In one embodiment, the conductivity is at least 55 S/m. In one embodiment, the conductivity is at least 87 S/m.

In one embodiment, the BET surface area is at least 584 $m^2$/g. In one embodiment, the BET surface area is at least 762 $m^2$/g. In one embodiment, the BET surface area is at least 1,199 $m^2$/g.

In one embodiment, the mesopore volume is at least 2.9 $cm^3$/g. In one embodiment, the mesopore volume is at least 3.3 $cm^3$/g. In one embodiment, the mesopore volume is at least 6.4 $cm^3$/g. In one embodiment, the mesopore volume is at least 2.9 $cm^3$/g, the BET surface area is at least 584 $m^2$/g, and the conductivity is at least 25 S/m.

In one embodiment, the composition shows in x-ray diffraction a broad peak from about 12° to about 20° and a sharper feature at about 28°.

In one embodiment, the composition shows in x-ray diffraction no significant peaks for an amorphous structure.

In one embodiment, the atomic oxygen content is 5% or less.

In one embodiment, the aerogel comprises graphene sheets which are randomly oriented, and wherein the graphene sheets comprises single-layered and few-layered graphene.

In one embodiment, the aerogel comprises graphene sheets which have lateral dimensions of at least 200 nm.

In one embodiment, the aerogel comprises graphene sheet for which the surfaces are substantially free of carbon nanoparticles.

In one embodiment, the aerogel is mesoporous.

In one embodiment, the aerogel has a peak pore diameter of about 2 nm to about 50 nm.

In one embodiment, the covalent carbon bonds for crosslinking the graphene sheets are primarily not $sp^3$ bonds.

Still further, another embodiment provides a method comprising: preparing a reaction mixture comprising a graphene oxide (GO) suspension and at least one catalyst; curing the reaction mixture to produce a wet gel; drying the wet gel to produce a dry gel; and pyrolyzing the dry gel to produce a graphene aerogel.

In one embodiment, the GO suspension is an aqueous suspension or a suspension in at least one organic solvent.

In one embodiment, the reaction mixture comprise a GO concentration of 2 mg/cc or more.

In one embodiment, the reaction mixture comprises resorcinol and formaldehyde. In another embodiment, the reaction mixture is free of resorcinol and formaldehyde. In a further embodiment, the reaction mixture does not comprise additional reactants known for sol gel reactions in addition to GO and the catalyst.

In one embodiment, the reaction mixture comprises resorcinol and formaldehyde, and wherein the ratio of GO/(resorcinol and formaldehyde) is 0.1 or more.

In one embodiment, the reaction mixture is cured at a temperature of 100° C. or less.

In one embodiment, the reaction mixture is cured at atmospheric pressure.

In one embodiment, the step of drying the wet gel comprises solvent exchange.

In one embodiment, the step of drying the wet gel comprises drying the wet gel with supercritical $CO_2$.

In one embodiment, the step of pyrolyzing the dry gel comprises drying the dry gel in an inert atmosphere at a temperature of 500° C. or higher.

In one embodiment, the method further comprises thermally activating the graphene aerogel in an oxidizing atmosphere to produce an activated graphene aerogel.

In one embodiment, the method further comprises thermally activating the graphene aerogel in $CO_2$ to produce an activated graphene aerogel, wherein the reaction mixture comprises an acid catalyst, resorcinol and formaldehyde, and wherein the activated graphene aerogel has a surface area of 2500 m/g or more and a capacity of 200 F/g or more In one embodiment, the reaction mixture comprises a base catalyst and is free of resorcinol and formaldehyde, and wherein without thermal activation the graphene aerogel has a surface area of 1,000 m/g or more and a capacity of 100 F/g or more.

Another embodiment provides a method comprising the step of providing a reaction mixture comprising at least one graphene precursor, converting the graphene precursor to a graphene aerogel in a sol gel process.

In one embodiment, the graphene precursor is graphene oxide and the reaction mixture further provides at least one aromatic compound which is different from the graphene precursor.

Another aspect provides devices comprising the composition described herein or made by the method described herein. For example, a device comprising the composition described herein or made by the method described herein is a capacitor, a battery, an electrode, a sensor, an actuator, a membrane, a catalyst support, or a hydrogen storage device.

In at least some of the embodiments provided herein, a unique method is described for producing ultra-low density graphene aerogels with high electrical conductivities and large surface areas. In fabricating macrossemblies that exhibit such properties, junctions can be formed between graphene sheets that would both structurally reinforce the assembly and provide conductive interconnections between the individual sheets. The methods presented here can utilize, in some embodiments, carbon to knit together graphene sheets into a macroscopic 3D structure. This approach can produce monolithic graphene architectures with low densities (approaching 10 mg/cm$^3$) and electrical conductivities more than two orders of magnitude greater than those reported for 3D graphene assemblies formed with physical crosslinks. Furthermore, the graphene aerogels can possess surface areas on par with those reported for very high quality 2D graphene sheets. [25]

BRIEF SUMMARY OF THE FIGURES

FIG. 20 shows exemplary data in density, surface area, and capacitance of carbon aerogels, activated carbon aerogels, graphene aerogels, and activated graphene aerogels.

FIG. 23 shows exemplary data in capacitance, RC time, energy density and max power density of graphene aerogels according to one embodiment of the application as compared to EDLC. EDLC is described in Miller et al, *Electrochem. Soc. Interf.* 17, 53 (2008). The capacitance from EIS measurements is taken at 0 V and 0.01 Hz. The RC time and energy/power density calculated for 1 V across 2 electrode supercapacitor (100 mm thick electrodes), zero load, negligible separator resistance. Fast charge/discharge (<100 ms) & high power density (>100 kW/kg) are achievable.

FIG. 26 shows the impact of activation time on mass loss and BET surface area according to one embodiment.

FIG. 29 shows exemplary data in capacitance, RC time, energy density and max power density of carbon aerogels, activated carbon aerogels, graphene aerogels, and activated graphene aerogels. Capacitance from EIS measurements is taken at 0 V and 0.01 Hz. RC time and energy/power density are calculated for 1 V across 2 electrode supercapacitors (100 mm thick electrodes), zero load, negligible separator resistance. Incorporating graphene into ACA structure results in improved energy and power density.

DETAILED DESCRIPTION

Introduction

Figure 1:
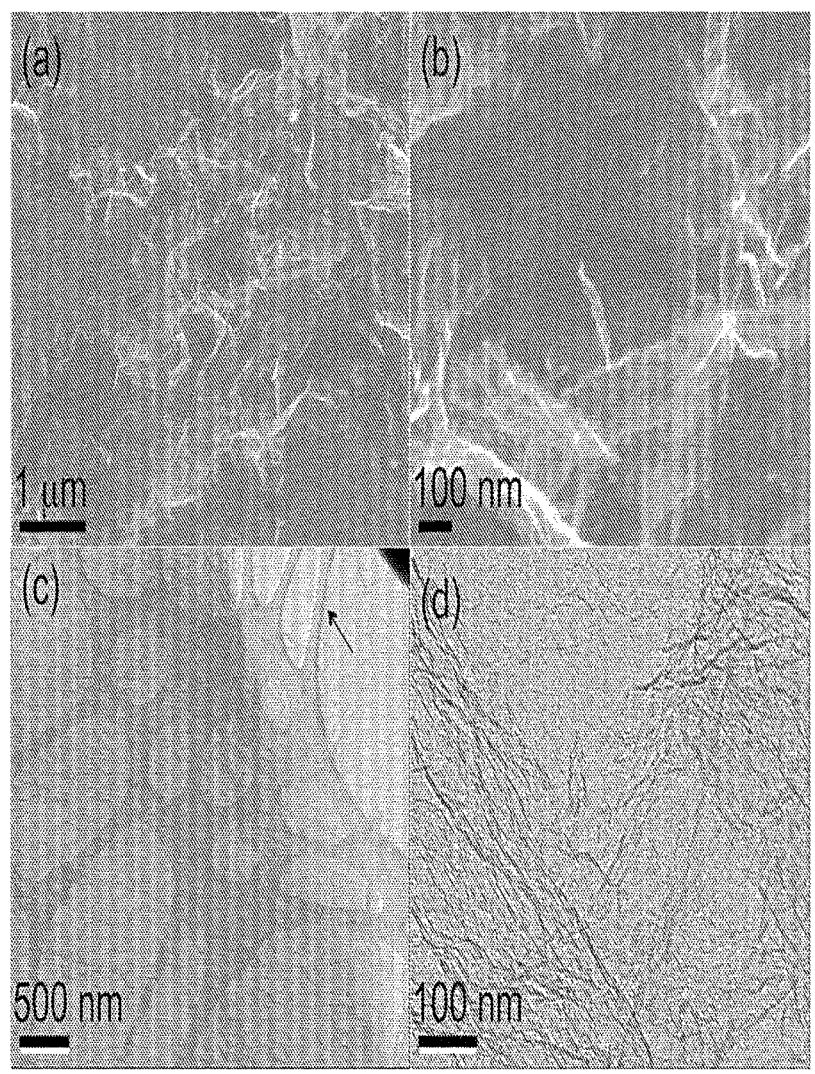
FIG. 1 shows images FE-SEM of the graphene aerogel according to one embodiment of the application at low (a) and high (b) magnification, as well as TEM images of the graphene aerogel at low (c) and high (d) magnification. Black arrow denotes holey carbon on TEM grid.

Carbon nanotube (CNT) aerogels exhibits high electrical conductivity and robust mechanical properties.[26] The CNT aerogels have been shown to be the stiffest low-density solid reported and were also highly elastic. These materials were assembled through the formation of covalent carbon cross-links between CNT bundles using organic sol-gel chemistry. Organic sol-chemistry involves the polymerization of organic precursors to form a highly crosslinked organic gel, which can then be dried and pyrolyzed to form a carbon aerogel.[27] When added to a suspension of CNTs, polymerization of the organic precursors occurred primarily on the CNTs, both coating the bundles and forming junctions between adjacent bundles. Upon drying and pyrolysis, the organic coating and junctions were converted to carbon, yielding the CNT aerogel.

In contrast, graphene aerogels described herein were fabricated using a graphene-based approach. In this case, GO was used to prepared the initial suspension, while carbonization of the organic crosslinks and thermal reduction of the GO to graphene occurred simultaneously during pyrolysis.

References cited herein can be used to practice and better understand the claimed inventions and are incorporated by reference herein in their entireties for all purposes.

Priority US provisional applications U.S. Ser. No. 61/371,442 filed Aug. 6, 2010, and 61/466,530 filed Mar. 23, 2011 are each incorporated herein by reference in their entireties for all purposes.

The article, "Synthesis of Graphene Aerogel with High Electrical Conductivity," Worsley et al., *J. Am. Chem. Soc.*, 2011, 2, 921-925, is incorporated herein by reference in its entirety.

The article, "High Surface Area, sp2-Cross-Linked Three-Dimensional Graphene Monolith," Worsley et al., *J. Phys. Chem. Letter*, 2010, 132(40), 14067-14069, is incorporated herein by reference in its entirety.

The article, "Advanced Carbon Aerogels for Energy Applications," Biener et al., *Energy & Environmental Science*, 2011, 4, 656-667, is incorporated herein by reference in its entirety.

US Patent Publication 2011/0024698 to Worsley et al., "Mechanically Stiff, Electrically Conductive Composites of Polymers and Carbon Nanotubes" is incorporated herein by reference in its entirety.

US Patent Publication 2010/0190639 to Worsley et al., "HIGH SURFACE AREA, ELECTRICALLY CONDUCTIVE NANOCARBON-SUPPORTED METAL OXIDE" is incorporated herein by reference in its entirety.

US Patent Publication 2010/0187484 to Worsley et al., "MECHANICALLY ROBUST, ELECTRICALLY CONDUCTIVE ULTRALOW-DENSITY CARBON NANOTUBE-BASED AEROGELS" is incorporated herein by reference in its entirety.

US Patent Publication 2010/0139823 to Gash et al., "PYROPHORIC METAL-CARBON FOAM COMPOSITES AND METHODS OF MAKING THE SAME" is incorporated herein by reference in its entirety.

Various terms used in this patent application are described further herein below.
CA=carbon aerogel
ACA=activated carbon aerogel
CNT=carbon nanotubes
CNT-CA=carbon nanotube & carbon aerogel composite
SWNT=single-walled carbon nanotubes
DWNT=double-walled carbon nanotubes
PVA=polyvinyl alcohol
CVD=chemical vapor deposition
TEM=transmission electron microscopy
SEM=scanning electron microscopy
RF=resorcinol and formaldehyde solids
BET=Brunauer-Emmett-Teller
EIS=Electrochemical impedance spectroscopy
XRD=X-ray diffraction
NMR=Nuclear Magnetic Resonance
RGO=Reduced graphene oxide
GO=Graphene oxide
"Mechanically Robust"=can withstand strains greater than 10% before fracture
"Electrically Conductive"=Exhibits an electrical conductivity of 10 S/m or greater.
"Carbon Nanotube-Based Aerogel"=porous carbon material comprising 5% to 95% carbon nanotubes by weight.

Also, as used in the specification and claims, the singular form "a", "an" and "the" include plural references unless the context clearly dictates otherwise. For example, the term "a nanotube" includes a plurality of nanotubes.

As used herein, the term "comprising" is intended to mean that, for example, the compositions and methods include the recited elements, but do not exclude others. "Consisting essentially of" when used to define, for example, compositions and methods, shall mean excluding other elements of any essential significance to the combination for the intended use. "Consisting of" shall mean excluding more than trace elements of other ingredients and substantial method steps for administering the compositions of this invention. Embodiments defined by each of these transition terms are within the scope of this invention.

Process for Making Graphene Aerogels/Reaction Mixture

Precursors to graphene are known in the art. For example, graphene oxide is a general term for oxidized graphene, which can be a precursor to graphene. Closely related precursors can include, for example, graphite oxide, single layer graphene oxide, exfoliated graphite, and the like.

In one embodiment, the reaction mixture comprises a graphene oxide (GO) suspension. Methods for making GO are known in the art and disclosed in, for example, Hummer, *J. Am. Chem. Soc.*, 80:1339 (1958), which is incorporated herein by reference in its entirety. In one embodiment, the GO suspension is an aqueous suspension. In another embodiment, the GO suspension is a suspension of at least one organic solvents, such as alcohol, dimethylformamide, tetrahydrofuran, ethylene glycol, N-methylpyrrolidone, etc. In one embodiment, the GO suspension is an aqueous suspension made by sonicating GO in deionized water. The time for sonication can range from 0.5-24 hours. The concentration of GO in the reaction mixture can be 0.1 mg/cc or more, or 1 mg/cc or more, or 2 mg/cc or more, or 5 mg/cc or more, or 10 mg/cc or more.

The reaction mixture may also comprise additional reactant known for sol gel reactions, though it is may not be necessary for gelation. In one embodiment, the reaction mixture comprises resorcinol-formaldehyde (RF), phloroglucinol-formaldehyde, phenol-formaldehyde, cresol-formaldehyde, or phenol-furfuryl alcohol. In one embodiment, the reaction mixture is free of RF. In another embodiment, the reaction mixture comprises RF. In a preferred embodiment, the GO-to-RF ratio is 0.1 or more.

The reaction mixture also can comprise at least one sol gel catalyst. In one embodiment, the catalyst is an acid catalyst. In another embodiment, the catalyst is a base catalyst. Catalysts suitable for making graphene aerogels include, but are not limited to, nitric acid, acetic acid, ascorbic acid, hydrochloric acid, sulfuric acid, sodium carbonate, sodium hydroxide, ammonium hydroxide, and calcium sulfate. The reactant-to-catalyst ratio may range from 10 to greater than 1000.

Graphene aerogels can be made from the reaction mixture according to the following steps: (1) curing the reaction mixture to produce a wet gel (i.e., a reduced GO hydrogel); (2) drying the wet gel to produce a dry gel (i.e., a reduced GO aerogel); and (3) pyrolyzing the dry gel to produce a graphene aerogel.

In one embodiment, the reaction mixture is cured at a temperature of 25-100° C. to produce a wet gel. In another embodiment, the reaction mixture is cured for 4-168 hours at a temperature of 85° C. In a further embodiment, the reaction mixture is cured at atmospheric pressure.

In one embodiment, the wet gel is subjected to solvent exchange to remove reaction by-products. Suitable solvent include, but are not limited to, DI water. In another embodiment, the wet gel is subjected to solvent exchange to remove water. Suitable solvents include, but are not limited to, acetone.

In one embodiment, the wet gel is dried in a supercritical gas to produce a dry gel. Suitable supercritical gases include, but are not limited to, supercritical $CO_2$. In another embodiment, the wet gel is dried under ambient temperature and pressure.

In one embodiment, the dry gel is pyrolyzed in an inert gas to produce a graphene aerogel. Suitable inert gases include, but are not limited to, $N_2$. The drying temperature can be 500° C. or more, or 800° C. or more, or 1000° C. or more.

In one embodiment, a graphene aerogel can be further activated to produce an activated aerogel with increased surface area. In one embodiment, the graphene aerogel is thermally activated in an oxidizing atmosphere. Suitable oxidizing atmospheres include, but are not limited to, $CO_2$. The temperature for the thermal activation can be 900° C. or more, or 1000° C. or more.

Figure 16:
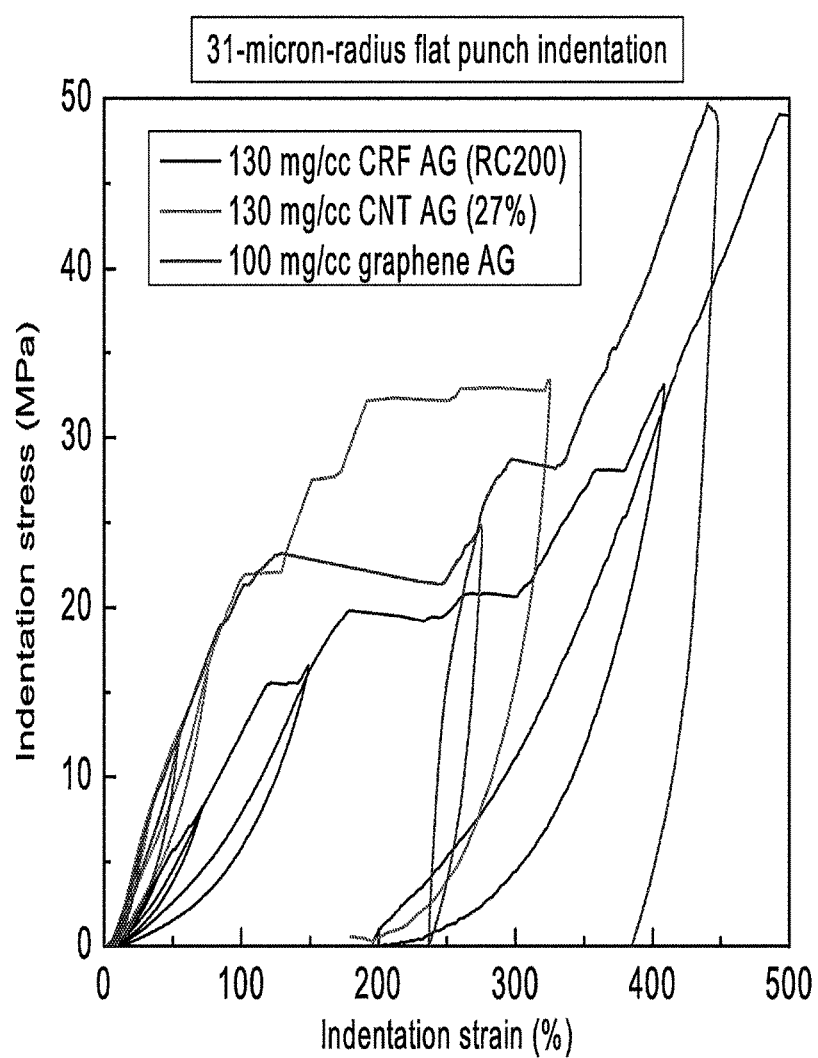
FIG. 16 shows the nanoindentation behavior of graphene aerogels, carbon nanotubes and carbonized resorcinol-formaldehyde.
Figure 17:
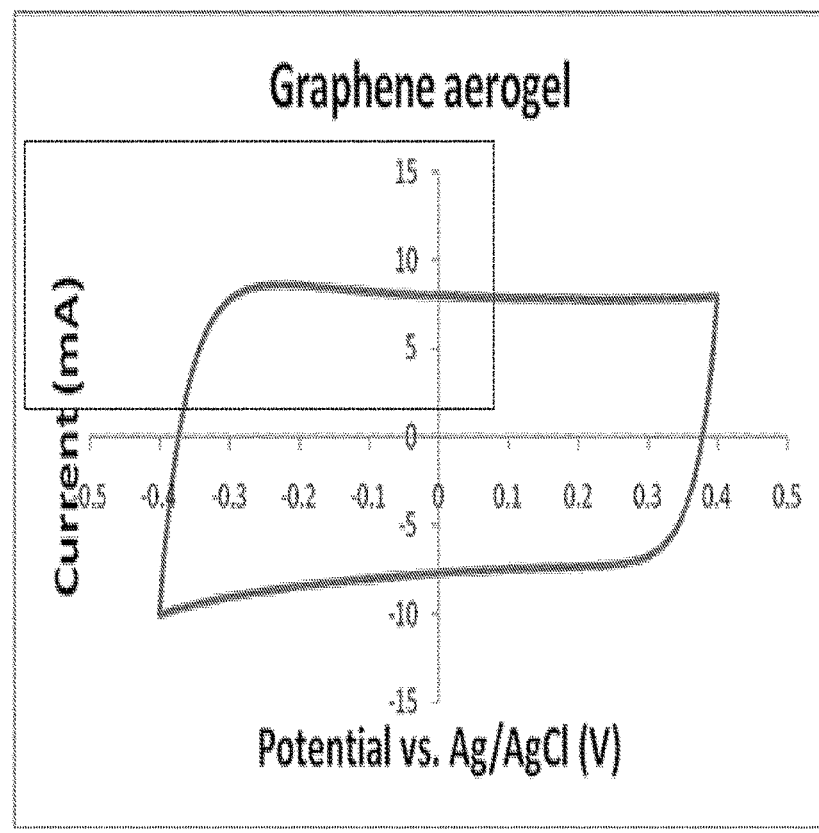
FIG. 17 shows a cyclic voltammetry plot of graphene aerogels according to one embodiment.

The graphene aerogel as shown in FIGS. 16-17 is made according to the following steps: (1) providing a RF-free reaction mixture comprising GO and a base acid catalyst; (2) curing the reaction mixture to produce a wet gel; (3) solvent exchange in DI water; (4) drying the wet gel to produce a dry gel; and (5) pyrolyzing the dry gel to produce a graphene aerogel. In this embodiment, the graphene aerogel exhibits excellent mechanical properties (modulus of 50 MPa), higher capacitance (>100 F/g), higher surface area, and excellent density.

Figure 18:
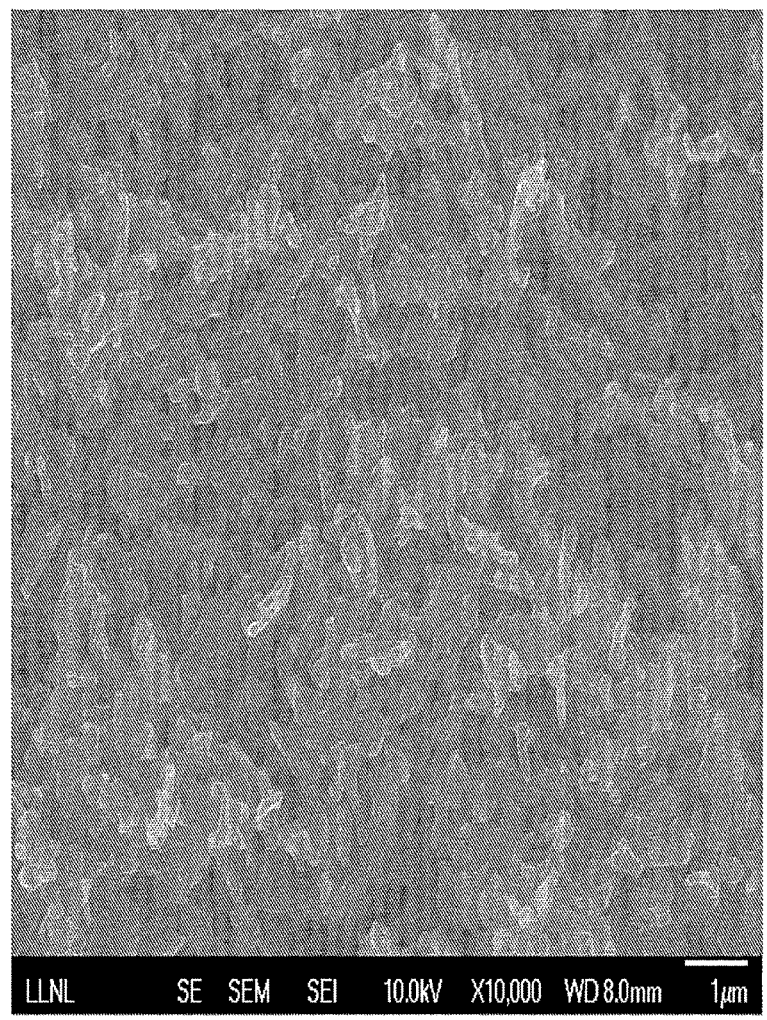
FIG. 18 shows a SEM image of activated graphene aerogels according to one embodiment.
Figure 19:
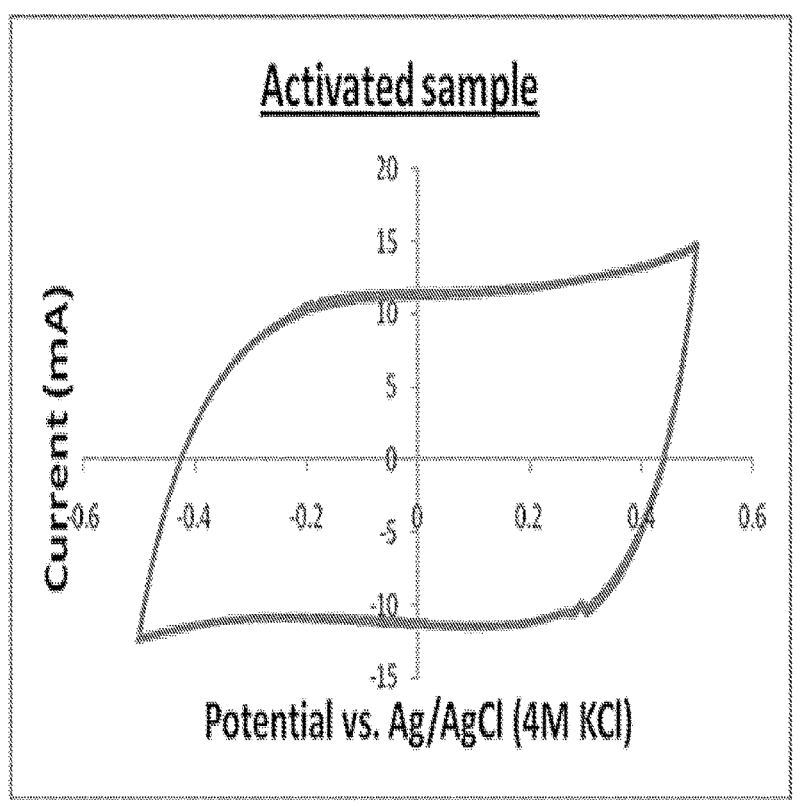
FIG. 19 shows a cyclic voltammetry plot of activated graphene aerogels according to one embodiment.
Figure 21:
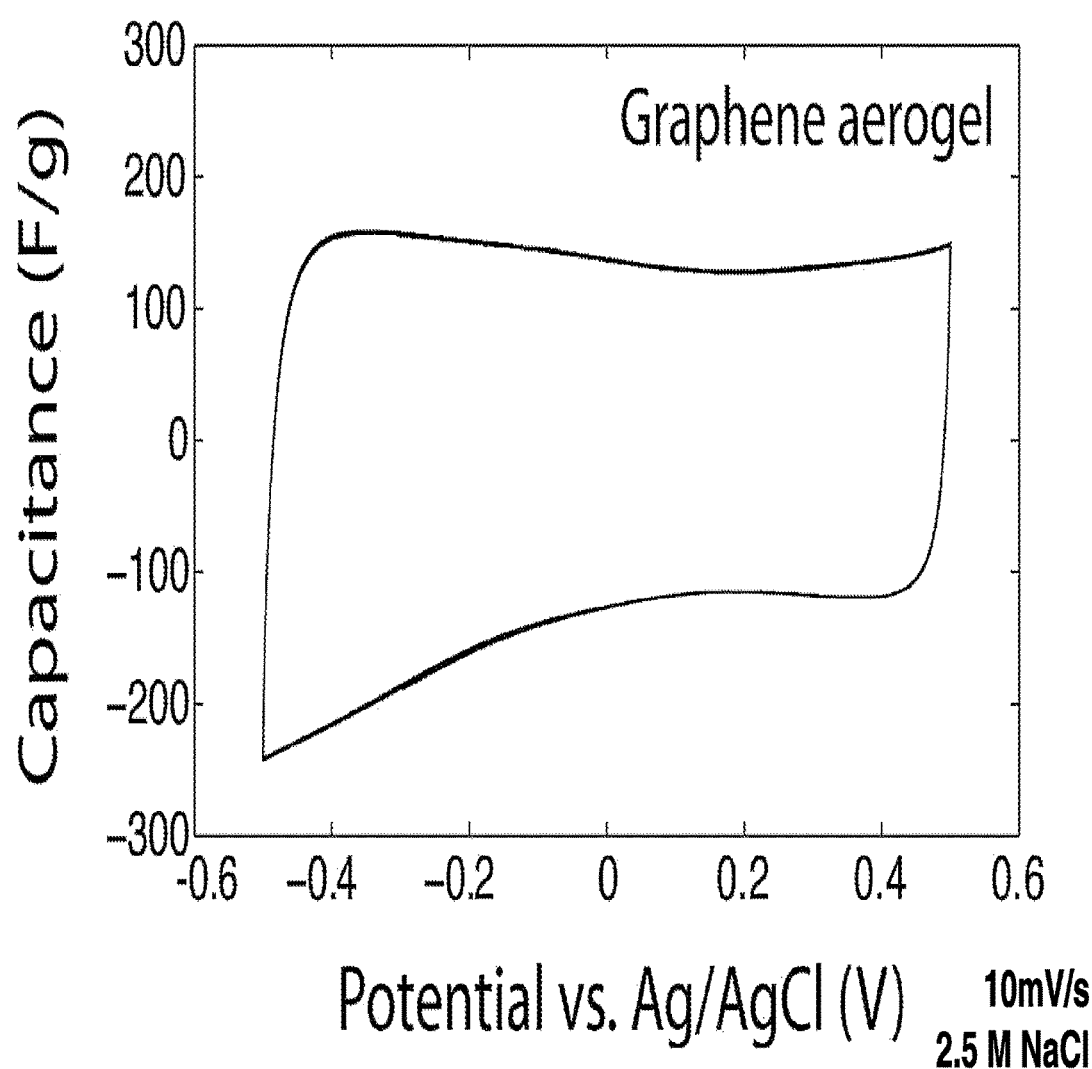
FIG. 21 shows the power density behavior of graphene aerogels according to one embodiment.
Figure 22:
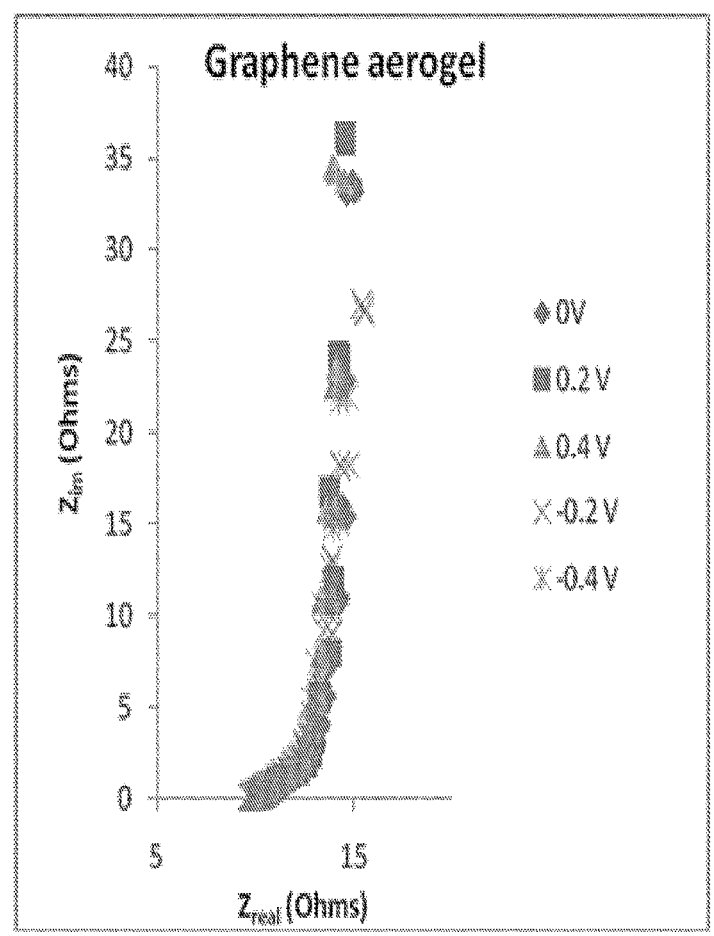
FIG. 22 shows the electrochemical impedance spectroscopy (EIS) data for the graphene aerogel.
Figure 24:
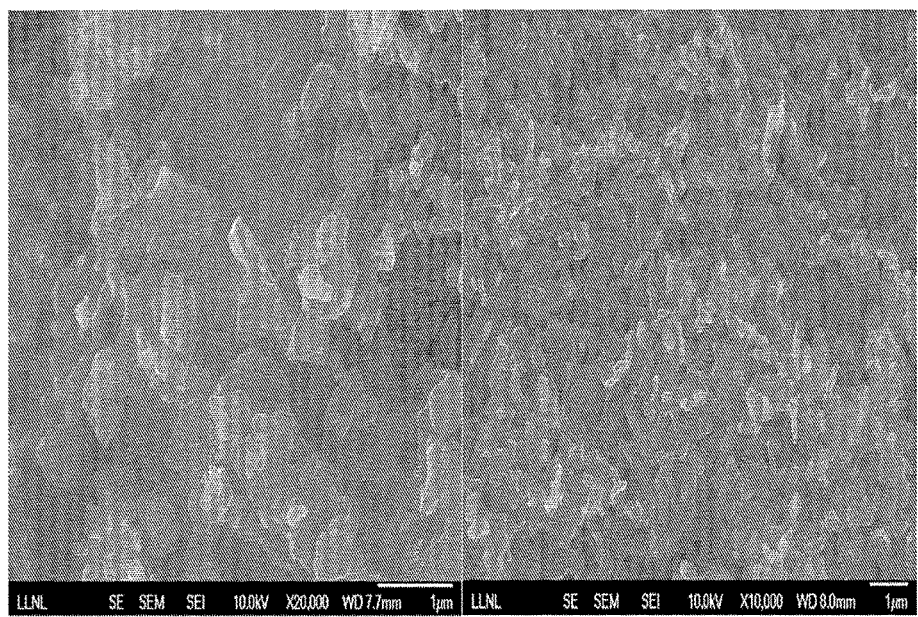
FIG. 24 shows SEM images of unactivated and activated graphene aerogels according to embodiments.
Figure 25:
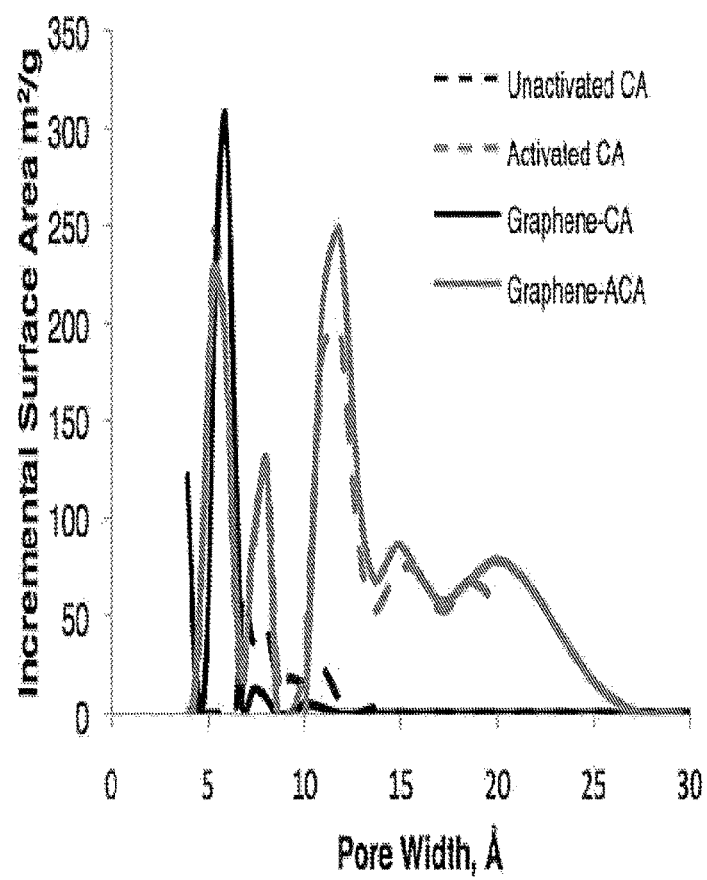
FIG. 25 shows exemplary comparison in pore width among carbon aerogels, activated carbon aerogels, graphene aerogels, and activated graphene aerogels.
Figure 27:
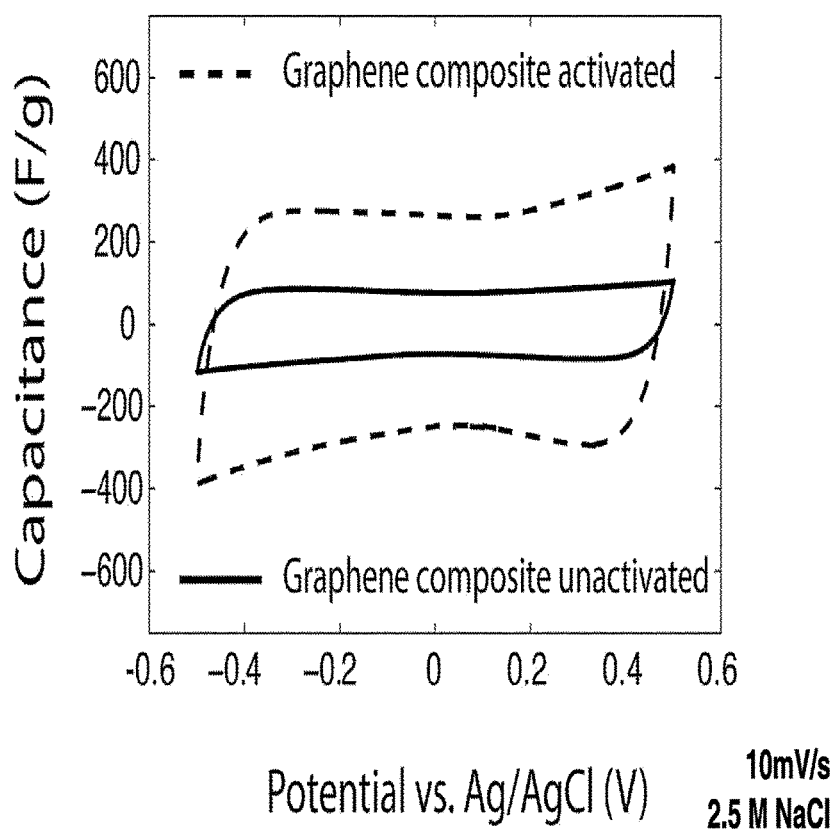
FIG. 27 shows the power density behavior of activated graphene aerogels as compared to unactivated graphene aerogels according to embodiments.
Figure 28:
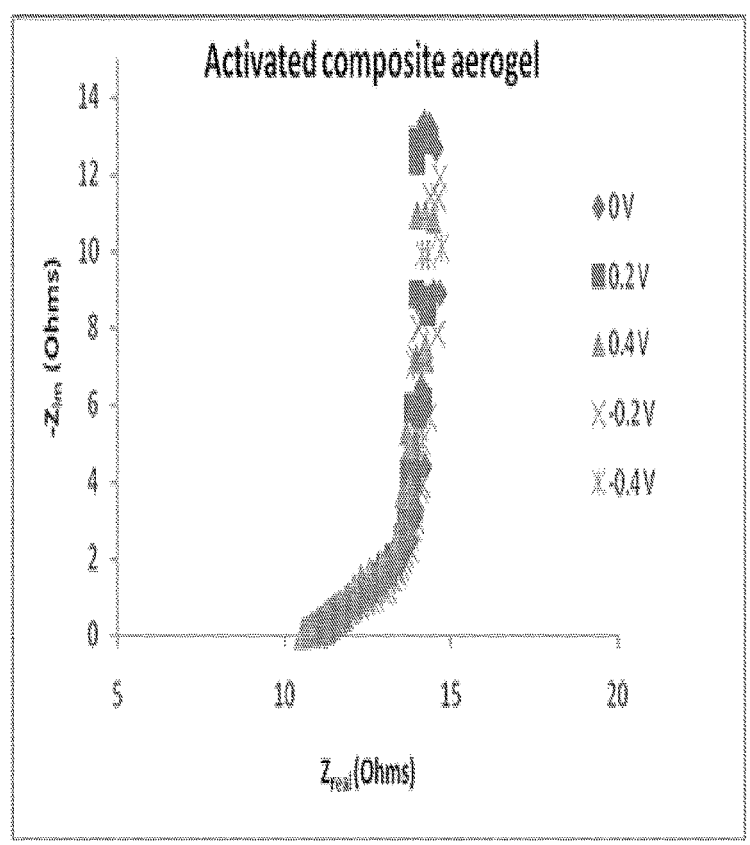
FIG. 28 shows the electrochemical impedance spectroscopy (EIS) data for the activated graphene composite aerogel.

The activated graphene aerogel as shown in FIGS. 18-19 is made according to the following steps: (1) providing a reaction mixture comprising GO, RF, and an acid catalyst; (2) curing the reaction mixture to produce a wet gel; (3) drying the wet gel under ambient condition to produce a dry gel; (4) carbonizing the dry gel under nitrogen to produce a graphene aerogel; and (5) thermally activating the graphene aerogel in $CO_2$ to produce an activated graphene aerogel with 140% increase in capacitance (gravimetric) as compared to a unactivated graphene aerogel. In this embodiment, GO is embedded in RF before carbonization. Incorporating graphene into ACA structure provides for more efficient use of surface area for energy storage, and results in improved energy and power density.

Graphene Aerogels/Activated Graphene Aerogels

A graphene aerogel can be a black monolith that is mechanically robust, electrically conductive, and of ultralow-density. Monolith is a term known in the art. Monolith and methods for making monolith are disclosed in, for example, U.S. Pat. No. 5,207,814, U.S. Pat. No. 5,885,953, U.S. Pat. No. 5,879,744, U.S. Pat. No. 7,378,188, U.S. Pat. No. 7,410,718, and U.S. Pat. No. 7,811,711.

The graphene aerogel can comprise a three-dimensional structure of graphene sheets crosslinked by chemical linkage such as covalent carbon-carbon bond. In one embodiment, 50% or more, or 70% or more, or 90% or more of the crosslinking covalent bonds are $sp^2$ bonds.

In one embodiment, the graphene aerogel is substantially free of graphene sheets interconnected only by physical crosslinks (e.g. Van der Waals forces). In another embodiment, less than 10%, or less than 5% or less than 3%, or less than 1% of the graphene sheets are interconnected only by physical crosslinks.

In one embodiment, the graphene aerogel is substantially free of graphene sheets interconnected only by metal crosslinks (e.g., noble metal such as Pd). In another embodiment, less than 10%, or less than 5% or less than 3%, or less than 1% of the graphene sheets are interconnected only by metal crosslinks.

In one embodiment, the graphene aerogel is substantial free of graphene sheets with hydroxyl or epoxide functionalities. In another embodiment, 3% or less, or 1% or less, or 0.5% or less, or 0.1% or less of the carbon atoms in the graphene aerogel are connected to a hydroxyl or epoxide functionality.

The graphene sheets can be randomly oriented. The graphene sheets can have lateral dimensions of 100 nm or more, 200 nm or more, or 500 nm or more. The surfaces of the graphene sheets can be substantially free of nanoparticles.

In a preferred embodiment, the graphene aerogel is not made by stacking non-organic material (e.g., metals such as Sn) between graphene sheets.

In one embodiment, the atomic oxygen content in the graphene aerogel is 10% or less, or 5% or less, or 3% or less, or 1% or less. The graphene aerogel can be mesoporous. The graphene aerogel can have a peak pore diameter of about 2 nm to about 50 nm.

In one embodiment, the graphene aerogel can have a surface area of 500 $m^2/g$ or more, or 700 $m^2/g$ or more, or 1000 $m^2/g$, or 1300 $m^2/g$ or more.

In another embodiment, the graphene aerogel has a bulk electrical conductivity of 20 S/m or more, or 50 S/m or more, or 100 S/m or more.

In one embodiment, the graphene aerogel has a capacitance of 50 F/g or more, or 70 F/g or more, or 100 F/g or more. In another embodiment, the graphene aerogel has a capacitance of 8 $\mu F/cm^2$ or more, or 9 $g/cm^2$ or more.

In one embodiment, the graphene aerogel has a density of 0.5 $g/cm^3$ or less, or 0.1 $g/cm^3$ or less, or 0.05 $g/cm^3$ or less.

In another embodiment, the graphene aerogel has a pore volume of 2 $cm^3/g$ or more, or 4 $cm^3/g$ or more, or 6 $cm^3/g$ or more.

In one embodiment, the elastic modulus for the graphene aerogel is 10 MPa or more, or 25 MPa or more, or 50 MPa or more.

An activated graphene aerogel can have increased surface area as compared to an unactivated graphene aerogel. In one embodiment, the activated graphene aerogel has a surface area of 1000 $m^2/g$ or more, or 2000 $m^2/g$ or more, or 2500 $m^2/g$ or more. In another embodiment, the activated graphene aerogel has a capacitance of 150 F/g or more, or 200 F/g or more, or 240 F/g or more.

In a further embodiment, the activated graphene aerogel has a capacitance of 7 $\mu F/cm^2$ or more, or 8 $\mu F/cm^2$ or more.

In yet another embodiment, the activated graphene aerogel has a density of 0.5 $g/cm^3$ or less, or 0.1 $g/cm^3$ or less, or 0.05 $g/cm^3$ or less.

Graphene Aerogel Filled with Nanomaterial

In one embodiment, a graphene aerogel can be filled with at least one nanomaterial, such as carbon nanotubes or silicon nanowires, by chemical vapor deposition. In one embodiment, the process for filling the graphene aerogel comprises the following steps: (1) providing an activated graphene aerogel with a continuous network of macropores throughout the thickness of said graphene aerogel; (2) disposing a metal catalyst in the macropores; (3) filling the macropores with a precursor gas of carbon nanotubes and allow the precursor gas to reach the same concentration inside and outside the activated graphene aerogel; (4) heating the activated graphene aerogel to deposit the carbon nanotubes throughout the thickness of the activated graphene aerogel, wherein the metal catalyst catalyzes the deposition of the carbon nanotubes. Methods for growing nanomaterials inside carbon aerogels are disclosed in U.S. provisional application Ser. No. 61/369,972, which is incorporated herein by reference in its entirety.

Applications

Graphene aerogels described herein can be used in a variety of devices. For example, graphene aerogels can be used in a capacitor, batter, electrode, actuator, sensor, membrane, catalyst support, and hydrogen storage device.

In one embodiment, a device comprising graphene aerogels can have an energy density of 4 W*hr/kg or more, or 10 W*hr/kg or more, or 20 W*hr/kg or more. In another embodiment, a device comprising graphene aerogel can have a power density of 150 kW/kg or more, or 300 kW/kg or more, or 400 kW/kg or more.

WORKING EXAMPLES

Additional embodiments are also provided in the following non-limiting working examples. For example, graphene-based aerogels were prepared and characterized.

Example 1

Synthesis of the Graphene Aerogel

Figure 2:
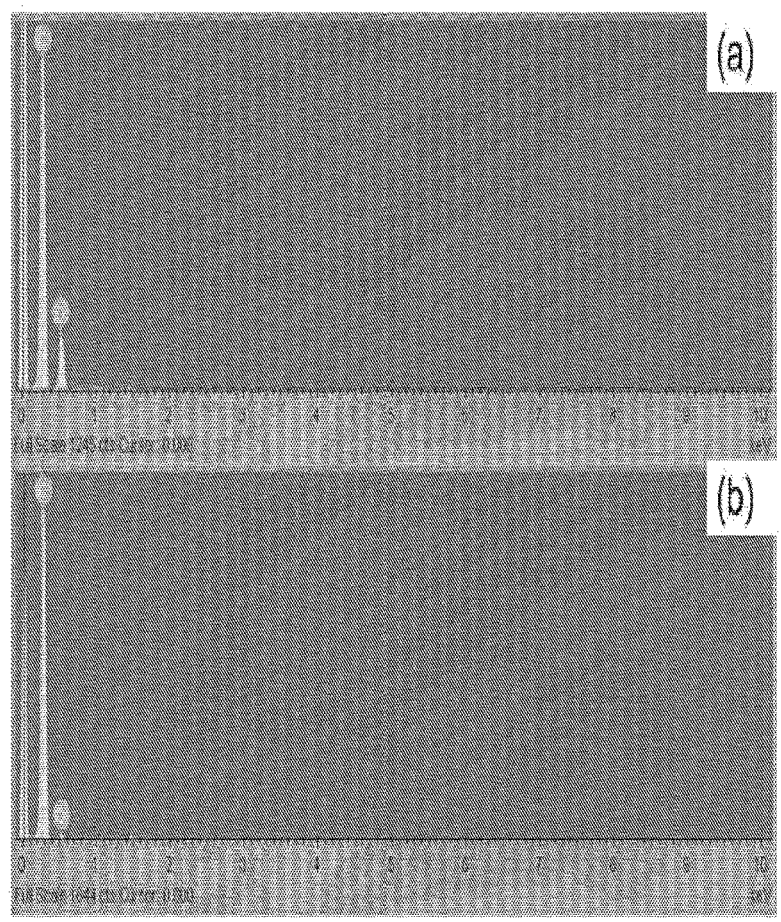
FIG. 2 illustrates energy-dispersive x-ray analysis (EDX spectra) showing successful thermal reduction of a GO-RF gel, showing a drop in atomic oxygen content from (a) 17% before thermal reduction to (b) 1% after thermal reduction.

Graphene aerogel synthesis was carried out by sol-gel polymerizaion of resorcinol (R) and formaldehyde (F) with sodium carbonate as a catalyst (C) in an aqueous suspension of GO. The GO was produced by Hummers method and the suspension was prepared by ultrasonication. The molar ratio of R:F was 1:2, the reactant concentration in the starting mixture was 4 wt % RF solids, and the concentration of GO in suspension was 1 wt %. The molar ratio of R:C was 200:1. The sol-gel mixture was cured in sealed glass vials at 85° C. After gelation, the wet GO-RF gels were removed from the glass vials and washed in acetone to remove water from the pores. Supercritical $CO_2$ was used to dry the GO-RF gels, and pyrolysis at 1050° C. under nitrogen yielded the final graphene aerogel. Energy dispersive x-ray analysis confirmed the successful reduction of the GO-RF gel showing a drop in atomic oxygen from 17% to 1% (FIG. 2).

The graphene aerogels were prepared using traditional organic sol-gel chemistry. In a typical reaction, graphene oxide (GO) was suspended in deionized water and thoroughly dispersed using a VWR Scientific Model 75T Aquasonic (sonic power ~90 W, frequency ~40 kHz). The concentration of GO in the reaction mixture ranged from 1 wt % to 10 wt %. To determine the optimal conditions for GO dispersion, a range of sonication times (4 to 24 hrs) were evaluated. Once the GO was dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol-to-catalyst ratios (R:C) employed was 200. The amount of resorcinol and formaldehyde (RF solids) was 4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical CO2 and pyrolyzed at 1050° C. under a N2 atmosphere for 3 h. The graphene aerogel materials were isolated as black cylindrical monoliths. The highest conductivity graphene aerogel was achieved with this method using 1 wt % GO and 4 wt % RF in the initial reaction mixture. Use of higher RF:GO ratios resulted in lower conductivity values.

Characterization

Energy dispersive x-ray (EDX) spectroscopy, and field-emission scanning electron microscopy (SEM) characterization was performed on a JEOL 7401-F at 5-10 keV (20 mA) in secondary electron imaging mode with a working distance of 2-8 mm. Transmission electron microscopy (TEM) characterization was performed on a Phillips CM-300FEG electron microscope operated at 300 kV. Samples for TEM were prepared by pulverizing aerogels above TEM grids. Carbon content in the reduced GO-RF was determined based on the mass of the GO-RF gel after drying and carbonization assuming 25 wt % loss in GO during reduction (e.g. total reduction). Carbon conversion from RF was determined to be 24 wt % of initial RF in reaction mixture.

Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 150° C. under vacuum (10-5 Torr) for at least 24 hours to remove all adsorbed species.

Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged. Bulk densities of the samples were determined from the physical dimensions and mass of each sample.

Results

Figure 3:
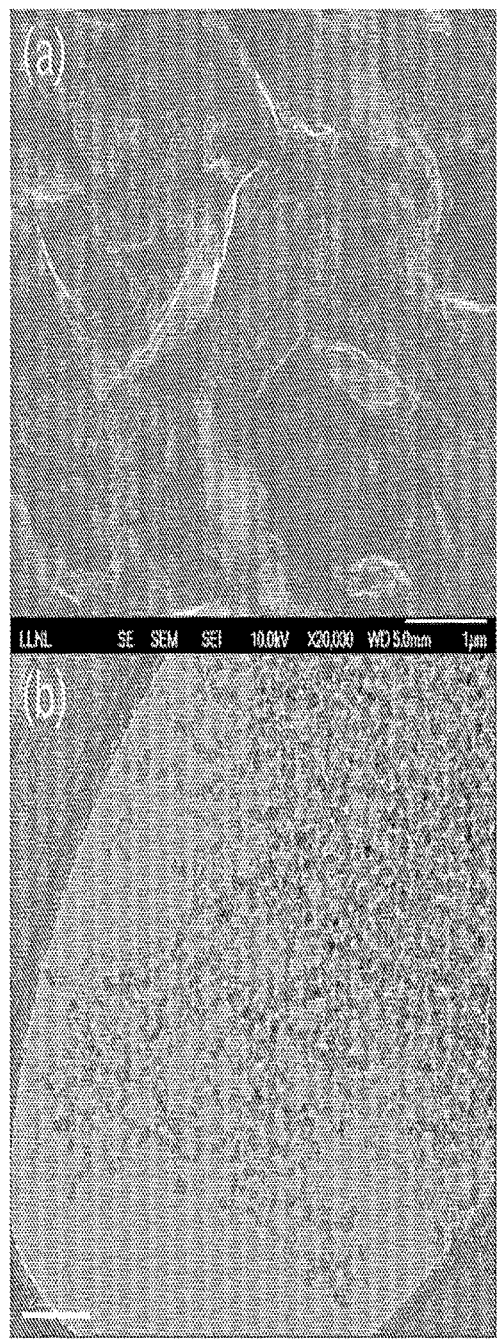
FIG. 3 illustrates reduced GO-RF materials prepared at higher RF:GO ratios in (a) FE-SEM and (b) TEM.

Field-emission scanning electron micrographs (FE-SEM) of the graphene aerogel show a 3D network of randomly oriented sheet-like structures (FIG. 1a-b) similar to those seen in previous reports of thermally reduced GO. The lateral dimensions of the sheets ranged from hundreds of nanometers to several microns. Within the assembly, the sheets are thin enough to be transparent to the electron beam. Transmission electron micrographs (TEM) reveal a wrinkled paper-like texture to the sheets (FIG. 1c-d), again consistent with previous reports. It is noted that, in both the FE-SEM and TEM images, one did not observe carbon nanoparticles from the RF polymer decorating the surfaces of the graphene sheets, despite the fact that over half of the weight in the reduced GO-RF structure can be attributed to carbon from the RF polymer (56 wt % from RF vs 44 wt % from GO). This is in sharp contrast to what occurs in materials prepared at higher RF:GO ratios (FIG. 3), or in CNT aerogels, where the carbonized RF is clearly distinguishable. This observation suggests that the carbon junctions are effectively incorporated into the extended graphene framework. When added at sufficiently low concentrations to the GO suspension, polymerization of the organic precursors likely occurs preferentially at the oxygen functionalities of the GO to form covalent interconnections between individual sheets. Simultaneous carbonization of the RF junctions and thermal reduction of the GO apparently blends these two materials into a single structure, yielding the graphene macroassembly.

Figure 4:
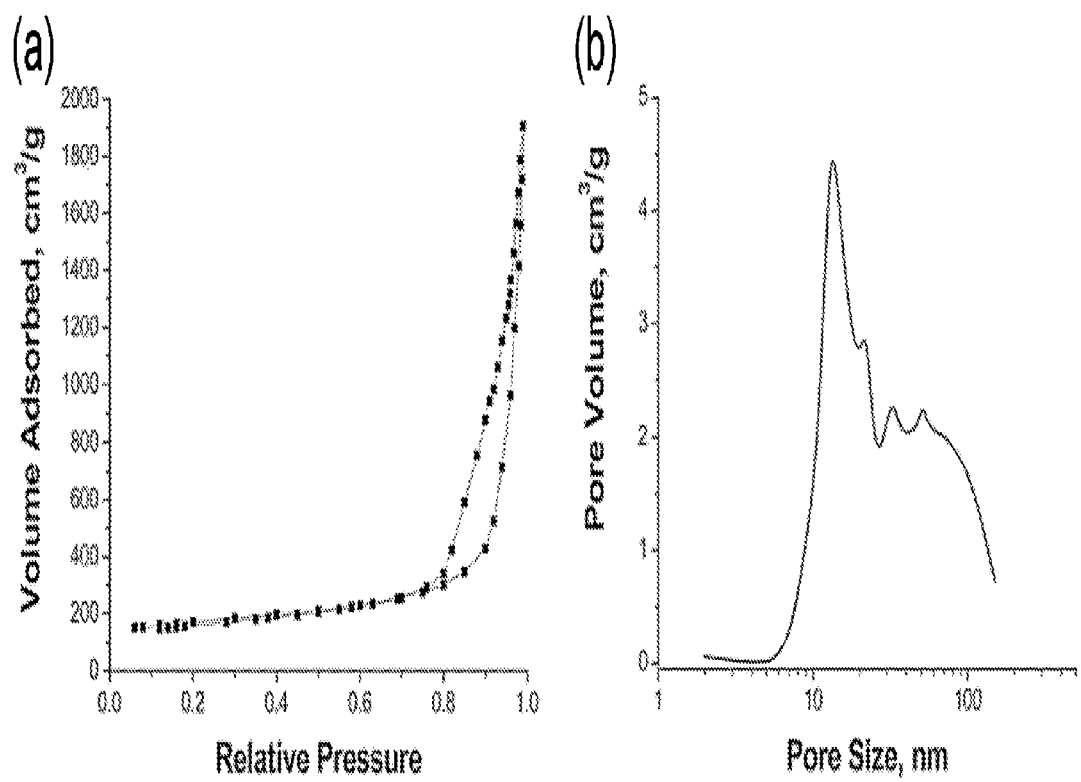
FIG. 4 shows Nitrogen adsorption/desorption isotherm (a) and pore size distribution (b) for graphene aerogel according to one embodiment of the application.

The Type IV nitrogen adsorption/desorption isotherm for the graphene aerogel indicates that the material is mesoporous. The Type 3 hysteresis loop (IUPAC classification) at high relative pressure is typically associated with adsorption within aggregates of plate-like particles, consistent with the microstructure observed by FE-SEM and TEM. The pore size distribution for the graphene aerogel, as determined by the BJH method, shows that much of the pore volume (2.96 cm$^3$/g) lies in the 10-100 nm range, with a peak pore diameter of 13 nm (FIG. 4b). The BET surface area for the graphene aerogel was 584 m$^2$/g. This value is less than the theoretical surface area for a single graphene sheet (>2600 m$^2$/g), likely due to layering or overlapping of graphene sheets within the assembly. Nevertheless, the measured surface area is on par with those reported for high quality graphene sheets prepared via hydrogen arc discharge, and is more than two times greater than that of the CNT aerogel.

Bulk electrical conductivity of the graphene aerogel was determined via the four-probe method. Current (100 mA) was passed through metal electrodes attached to either end of the graphene aerogel monolith and the voltage drop was measured over distances of 3-6 mm along the aerogel. The bulk electrical conductivity of the graphene aerogel was determined to be 87 S/m, more than two orders of magnitude greater than those reported for macroscopic 3D graphene networks prepared with physical cross-links. We believe this extraordinarily high conductivity is due to a large reduction in resistance at the junctions between graphene sheets compared to those in the physically bonded networks.

In summary, a macroscopic 3D graphene assembly was prepared with high electrical conductivity and large surface area. This approach used an organic binder that could be reduced concurrently with the GO to produce carbon cross-links in the graphene network that were virtually indistinguishable from the graphene sheets. Due to the high surface area, mesoporosity, and conductivity of these 3D graphene assemblies, they can be used in a number of technologies such as, for example, supercapacitors, batteries, catalysis, and sensors.

Example 2

Materials Synthesis.

The graphene aerogels were prepared using traditional organic sol-gel chemistry. In a typical reaction, graphene oxide (GO) was suspended in deionized water and thoroughly dispersed using a VWR Scientific Model 75T Aquasonic (sonic power ~90 W, frequency ~40 kHz). The concentration of GO in the reaction mixture was 1 wt %. To determine the optimal conditions for GO dispersion, a range of sonication times (4 to 24 hrs) were evaluated. Once the GO was dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol-to-catalyst ratios (R:C) employed was 200. The amount of resorcinol and formaldehyde (RF solids) ranged from 0-4 wt %. The sol-gel mixture was then transferred to glass molds, sealed and cured in an oven at 85° C. for 12-72 h. The resulting gels were then removed from the molds and washed with acetone for 72 h to remove all the water from the pores of the gel network. The wet gels were subsequently dried with supercritical $CO_2$ to yield the GO and GO-RF aerogels. These aerogels were reduced via pyrolysis at 1050° C. under a $N_2$ atmosphere for 3 h. The graphene aerogel materials were isolated as black cylindrical monoliths.

Figure 5:
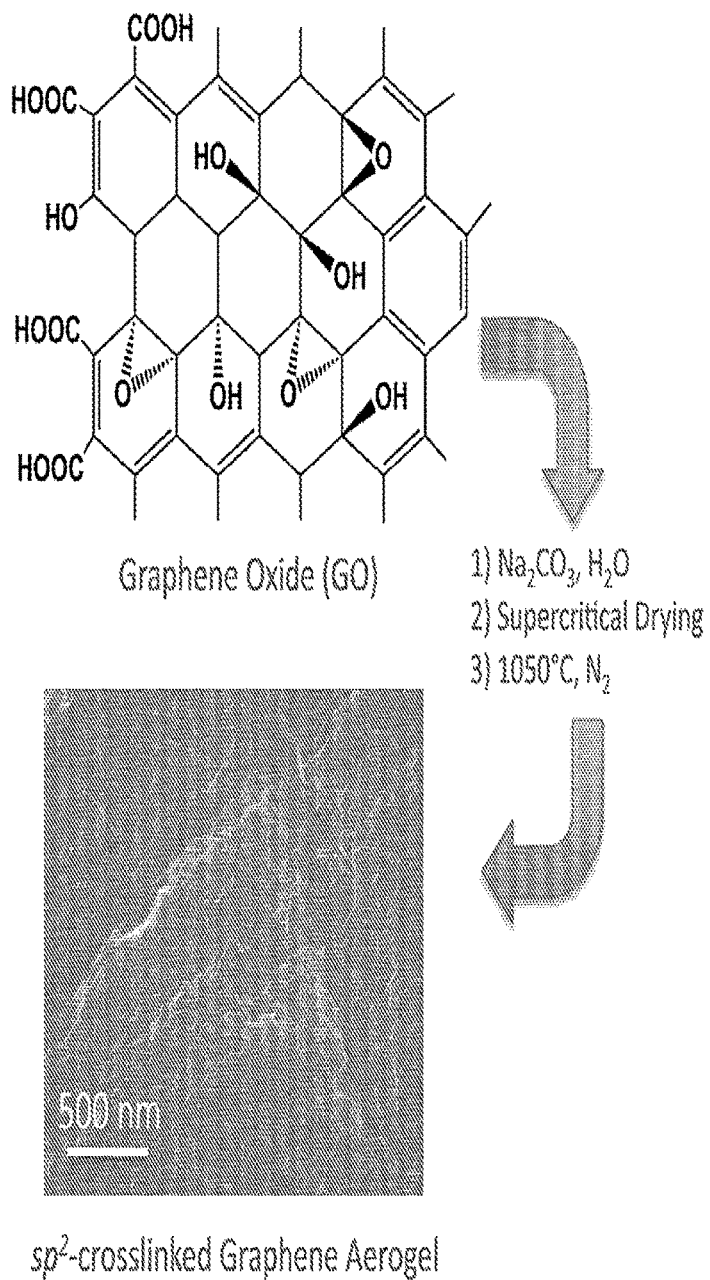
FIG. 5 shows a synthesis scheme for graphene aerogels according to one embodiment of the application.

See FIG. 5.

Characterization.

Field-emission scanning electron microscopy (SEM) characterization was performed on a JEOL 7401-F at 5-10 keV (20 mA) in secondary electron imaging mode with a working distance of 2-8 mm. X-ray diffraction (XRD) measurements were performed on a Bruker AXS D8 ADVANCE X-ray diffractometer equipped with a LynxEye 1-dimensional linear Si strip detector. The samples were scanned from 5 to 35° 2θ. The step scan parameters were 0.02° steps and 2 second counting time per step with a 0.499° divergence slit and a 0.499° antiscatter slit. X-ray source was Ni-filtered Cu radiation from a sealed tube operated at 40 kV and 40 mA. Phases in the samples were identified by comparison of observed peaks to those in the International Centre for Diffraction Data (ICDD PDF2009) powder diffraction database, and also peaks listed in reference articles. Goniometer alignment was ensured using a Bruker-supplied $Al_2O_3$ standard. Raman spectroscopy was performed on a Nicolet Almega XR Dispersive Raman spectrometer using a 25 μm slit and 10% laser power. X-ray absorption spectroscopy (XAS) measurements were conducted on beamline (BL) 8.0.1 of the Advanced Light Source, LBNL in the total electron yield mode. The energy scale of BL8.0.1 was calibrated to the C(1s)→π*resonance for a freshly cleaved highly oriented pyrolytic graphite (HOPG) sample, to which an energy of 285.38 eV was assigned. All of the XAS spectra were calibrated to both the incident x-ray flux ($I_0$), measured via the drainage current to a gold-coated mesh preceding the experiment sample, and the magnitude of the absorption edge step, taken as the difference in absorbance at 280 versus 320 eV. Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 150° C. under vacuum ($10^{-5}$ Torr) for at least 24 hours to remove all adsorbed species. Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged. Bulk densities of the samples were determined from the physical dimensions and mass of each sample.

Results

Gelation of the GO suspension occurred across the full range of RF content (0-4 wt %). This result supports the hypothesis that cross-linking can occur not only via RF sol-gel chemistry, but also solely between the functional groups present on suspended GO sheets. Previous work also reports the gelation of GO suspensions, but has been limited to methods requiring high temperature and pressure (e.g. in an autoclave), or producing thin films (1 μm or less). In contrast, the present base-catalyzed method was achieved at less than 100° C. in glass vials, and could conceivably be accomplished at room temperature. Further investigations of the low temperature gelation of GO can be carried out. After gelation, all of the samples were dried using supercritical $CO_2$ and pyrolyzed at 1050° C. under $N_2$ to reduce the GO and RF to carbon.

Figure 6:
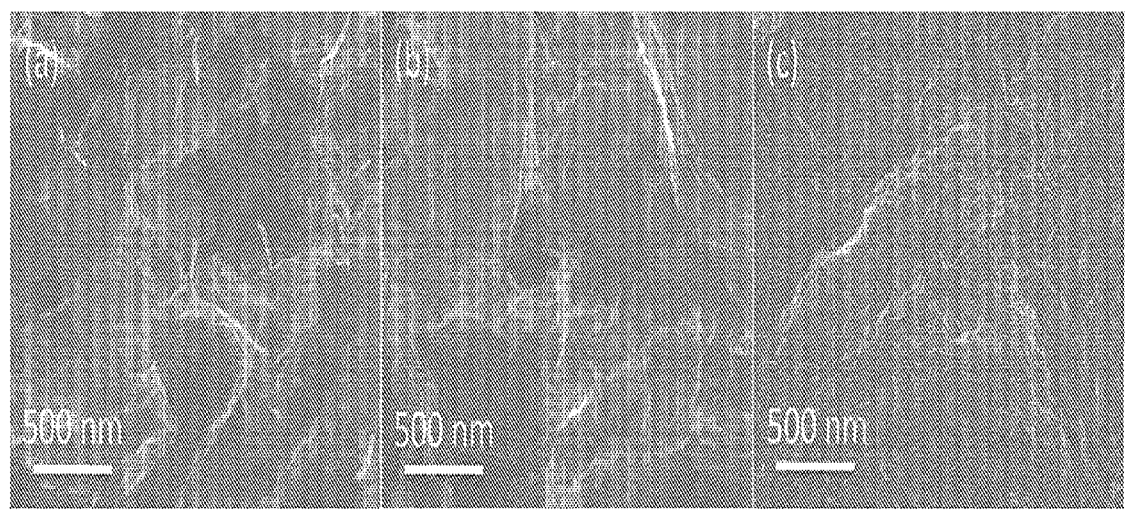
FIG. 6 shows SEM images of the graphene aerogels with (a) 4 wt %, (b) 2 wt %, and (c) 0 wt % initial RF-content.

Details of the microstructure of the graphene-based aerogels are revealed by SEM. (FIG. 6) The micrographs show a significant change in morphology as the RF content is reduced. All of the graphene-based aerogels exhibit a sheet-like structure similar to that observed in other graphene assemblies. In addition, no carbon nanoparticles from the RF polymer were observed on the surfaces of the graphene sheets up to 4 wt % RF content. However, as the RF content decreases, the features of the aerogel appear to become much finer. Specifically, the sheets in the aerogel appear more transparent (e.g. thinner) and the size of the voids between sheets appears smaller, particularly in the aerogel without any resorcinol. This observation would be consistent with maintaining a higher degree of exfoliation in the final graphene assembly when a lower RF content is used in the gelation process.

Figure 7:
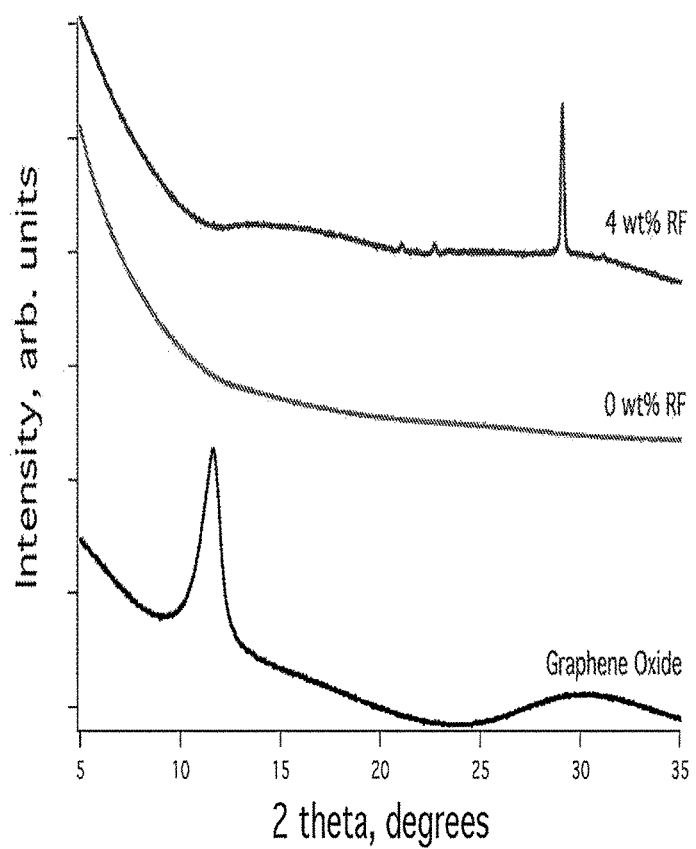
FIG. 7 shows XRD patterns of the graphene aerogels with 0 and 4 wt % initial RF content. Graphene oxide is included for reference. Patterns are offset for clarity.

X-ray powder diffraction (XRD) spectra for the graphene-based aerogels with (4 wt %) and without the RF are shown in FIG. 7. The diffraction pattern for GO shows a characteristic peak at about 12°. This feature is not present in either of the graphene-based aerogels. The material with 4 wt % RF content shows a broad peak from 12-20° and a sharper feature at about 28°. The broad peak is indicative of disordered few-layer graphene sheets which retain the GO interlayer separation. The 100/101 graphite peaks at about 28° (interlayer separation of graphite) are attributable to the heat-treated carbon derived from a disordered or organic precursor (i.e. RF polymer). The sample without RF shows no significant peaks indicating an amorphous structure. This is similar to what is observed with graphene sheets that are very well exfoliated. Though some layering is likely still present, it is disordered enough not to produce any diffraction peaks. Therefore, the XRD results also suggest superior exfoliation of the graphene sheets is maintained in the aerogel when the RF is omitted.

Figure 8:
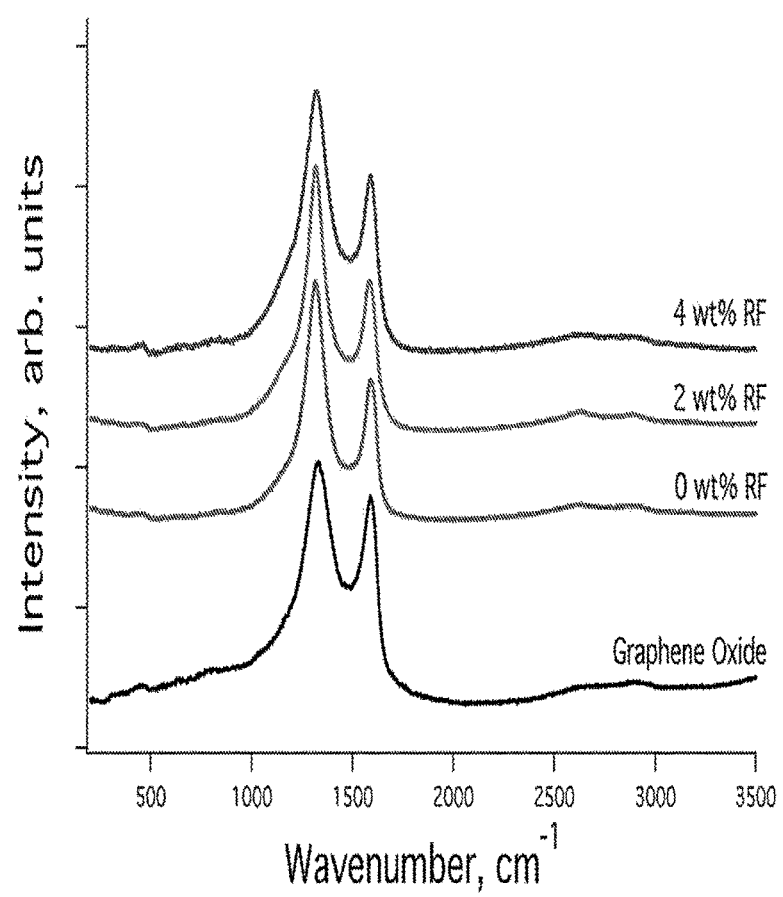
FIG. 8 shows Raman spectra of the graphene aerogels. Graphene oxide is included for reference. Spectra are offset for clarity.

Raman spectra of the graphene-based aerogels with different RF content are shown in FIG. 8. All spectra show strong D (1350 $cm^{-1}$) and G (1582 $cm^{-1}$) bands with weak, broad D' and G' features. Previous reports have shown that single-layer graphene exhibits a strong G band with no D band except at steps and edges, which serve as scatterers. Thus, the presence of a prominent D band in the bulk graphene-based aerogel spectra is most likely due to the many junctions inherent in the 3D graphene network, similar to that observed in polycrystalline graphite, as well as any defects remaining after reduction. Furthermore, peak narrowing was observed in the D and G bands with decreasing RF content suggesting less bond disorder and/or heteroatoms (O or H bonded carbon). The presence of carbon from the RF polymer is the likely cause of the broader D and G bands at higher RF content as the carbonization temperature of 1050° C. is not expected to remove all the hydrogen atoms introduced by the RF precursor. Therefore, eliminating the precursor from the graphene-based aerogel should decrease the hydrogen content and reduce broadening of the D and G bands.

Figure 9:
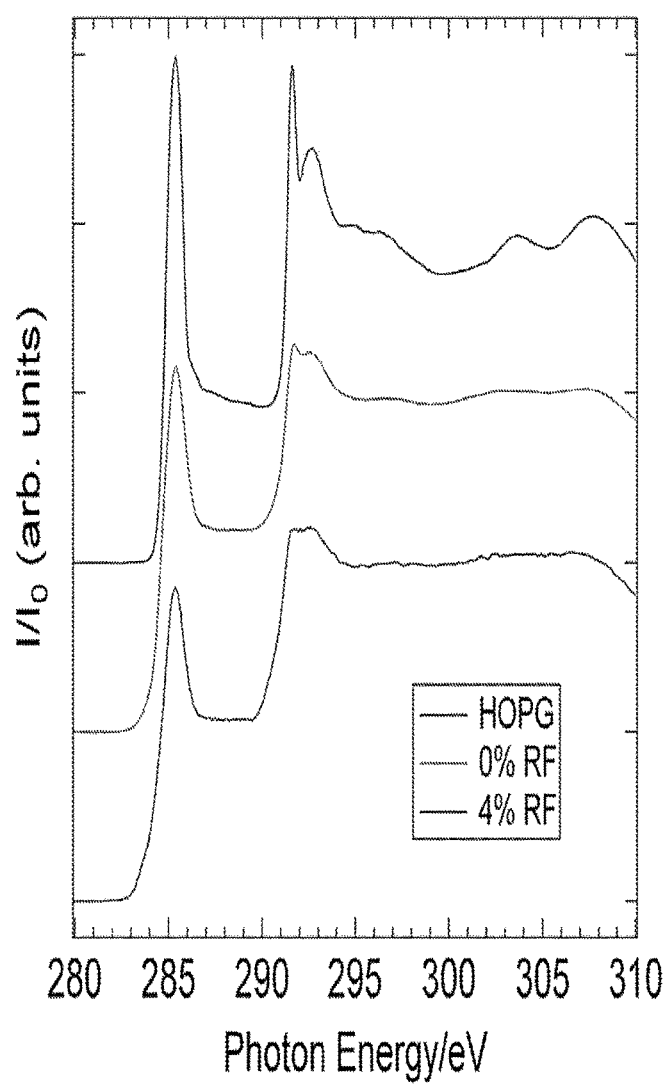
FIG. 9 shows XAS spectra recorded at the carbon K-edge for graphene aerogels with 0 and 4 wt % initial RF content and a freshly cleaved HOPG reference.

FIG. 9 displays C(1s) XAS spectra recorded at a 45° angle of incidence for graphene-based aerogels of different RF content and a freshly cleaved HOPG standard. The sharp resonance observed at about 285.4 eV in all of the spectra arises from the C(1s)→$\pi^*$ transitions anticipated for materials containing predominantly $sp^2$ carbon. Meanwhile, the resonance at about 291.5 eV is attributed to a core-hole exciton state and the series of broad resonances that follow at higher energies arise primarily from C(1s)→C—C$\sigma^*$ transitions. Neither the graphene-aerogel prepared in the absence of RF or the HOPG standard exhibit appreciable resonances in the characteristic range for spectral features associated with C—H $\sigma^*$-transitions, ~287 to 290 eV. As such, the proportion of carbon atoms bonded to hydrogen (i.e. those at the edge of a domain) in these materials resides close to or below the detection limits of the XAS measurement (about 2%) and the domain/crystallite size must be large enough that, on average, carbon atoms bonded only to carbon (i.e. at the interior of a domain) predominate by at least 98%. In contrast, the inclusion of 4% wt RF in the graphene-based aerogel leads to a broad absorption onset at lower energy than the excitonic feature, beginning at ~289.4 eV, which indicates an increase in the proportion of carbon bonded to hydrogen versus the HOPG standard and graphene aerogel prepared without RF, consistent with the Raman spectroscopy measurements. This observation in such a highly cross-linked network (FIG. 6) would support the hypothesis that the cross-links in the graphene aerogel prepared without RF are predominantly $sp^2$ in nature. With all of the junctions present in this aerogel, as suggested by the prominent D band in the Raman spectra (FIG. 8), significant $sp^3$ crosslinking would be apparent in the XAS spectra, as is the case for the aerogel prepared with RF. One can propose that, much like the $CH_2$-cross-links between individual aromatic rings in RF gels are broken during pyrolysis allowing the formation of aromatic multi-ring structures (e.g. $sp^2$ bonding) on the nanoscale, similar organic cross-links are likely formed between the GO sheets during gelation which can then be broken during pyrolysis to allow $sp^2$ bonding between the reduced GO sheets.

The absence of resolvable spectral features between the $\pi^*$ and excitonic resonances (between about 286 and 289.5 eV) in the XAS spectra for the HOPG and graphene based aerogels is of additional significance. Prior C(1s) XAS spectra recorded for graphene-based materials exhibit well-resolved resonances in this region that have been attributed to two distinct sources: (1) these features are reported to arise from the C—O $\sigma^*$-orbitals from surface moieties including carboxyl, hydroxyl and epoxide groups. As such, the XAS spectra presented in FIG. 9 provide compelling evidence that the vast majority of oxygen-containing functional groups present in the graphene oxide precursor are removed during synthesis of the aerogels, resulting in non-functionalized surfaces that are predominantly composed of sp$^2$ carbon. (2) Specific resonances in the 287 to 289.5 eV range have been assigned to interlayer states in the low symmetry region of the graphene Brillouin zone. These are not observed in the present spectra of graphene-based aerogels. The XAS was acquired using a spot size of about 100 microns by 100 microns, and thus probes a large ensemble of randomly-oriented graphene constituents. If these disputed interlayer states, observed locally in single and few-layer graphene are more than simply surface contamination, the heterogeneity of graphene domain sizes, shapes, and thicknesses in both the aerogels is proposed to obscure detectable and resolvable features.

Analysis of the resonance associated with the core-hole excition provides additional insight into the composition and structure of the graphene-based aerogels. The intensity of the excitonic resonance in the XAS spectra of the two aerogels is greatly reduced with respect to the HOPG. One can postulate that this difference arises due to a more heterogeneous chemical and physical structure in the aerogels than the HOPG standard. Comparison between the two aerogel spectra indicates that the excitonic resonance has a lower intensity and is less well resolved for the sample containing RF, which we accordingly attribute to the presence of greater degree of heterogeneity.

Figure 10:
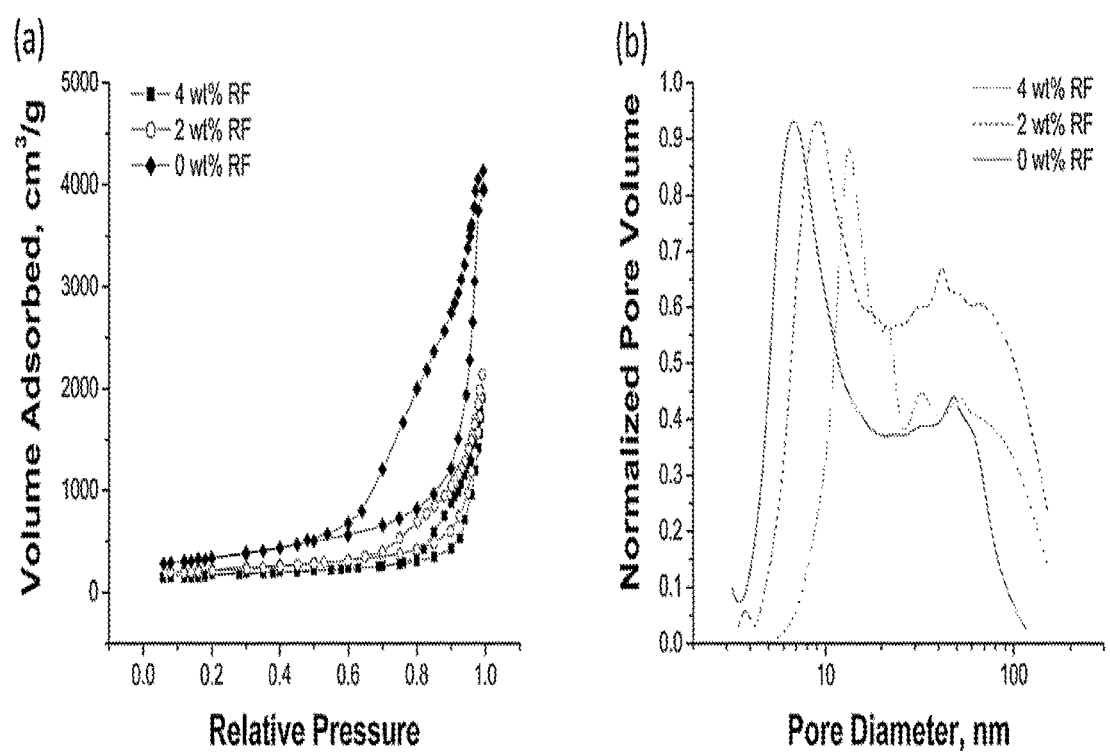
FIG. 10 shows (a) Nitrogen adsorption/desorption isotherms and (b) normalized pore size distribution plots for the graphene aerogels.

Nitrogen porosimetry data indicate that the RF content plays a critical role in the textural properties of the graphene-based aerogels. (FIG. 10a) Type IV adsorption/desorption isotherms were observed for all the graphene-based aerogels, indicating that significant mesoporosity exists. Consistent with the sheet-like structure observed in the electron micrographs, a Type 3 hysteresis loop (IUPAC classification) at high relative pressure points to adsorption within aggregates of plate-like particles for this material. As the RF content is reduced, total adsorption, as well as the size of the hysteresis loop grows. These phenomena translate into significantly increased BET surface area (1199 m$^2$/g) and pore volume (6.4 cm$^3$/g) in the aerogel without resorcinol. (Table 1, below) The large increase in surface area is likely due to the higher degree of exfoliation in the aerogel without RF content. While the theoretical limit for an individual graphene sheet (>2500 m$^2$/g) was not achieved, surface areas approaching this value appear to be in reach by improving the exfoliation of graphene sheets in the assembly. The pore size distribution (FIG. 10b) shows that the peak pore diameter drops from 13 nm at 4 wt % RF content to 7 nm at 0 wt % RF content. The shift in pore size distribution with decreasing RF content is consistent with the change in feature sizes observed by SEM for these materials. The electrical conductivities of the graphene-based monoliths are also shown in Table 1 for the range of RF contents. A modest decrease in conductivity was observed with the decrease in RF content. This is likely due to the lower density of the pure graphene aerogel, given the strong dependence of electrical conductivity on the bulk density of porous carbons.[30] That said, the conductivity of the pure graphene aerogel is still comparable to the aerogels cross-linked with RF-derived carbon, and is orders of magnitude higher than previously reported graphene assemblies.

TABLE 1

Physical properties of graphene-based aerogels

| Initial RF content, wt % | Density, g/cm$^3$ | BET Surface Area, m$^2$/g | Mesopore Volume, cm$^3$/g | Electrical Conductivity, S/m |
|---|---|---|---|---|
| 4 | 0.025 | 584 | 2.9 | 87 |
| 2 | 0.019 | 762 | 3.3 | 55 |
| 0 | 0.016 | 1199 | 6.4 | 25 |

In summary, 3D graphene assemblies were successfully fabricated with a range of RF content. In particular, low-temperature gelation of the GO suspension was realized without resorcinol yielding a graphene aerogel free of RF-derived carbon. The decreasing RF content produced a graphene assembly with a higher degree of exfoliation and less C—H bonding than observed at higher RF content. The resulting aerogel exhibited extraordinarily high surface area (about 1200 m$^2$/g) and large pore volume (about 6 cm$^3$/g), while maintaining the high conductivity observed in the RF-derived graphene aerogels. Given these novel properties, these graphene aerogels should be attractive candidates for energy storage, sensing, and catalytic application.

Example 3

Materials.

All reagents were used without further purification. Resorcinol (99%), formaldehyde (37 wt % in water), sodium hydroxide, and ammonium hydroxide (28-30 wt % in water) were purchased from the Sigma-Aldrich Chemical Co. Sodium carbonate was purchased from J. T. Baker Chemical Co. Acetic acid was purchased from GFS Chemicals Inc. Single layer graphene oxide was purchased from Cheap Tubes Inc.

Instrumentation.

Energy dispersive x-ray (EDX) spectroscopy and field-emission scanning electron microscopy (FE-SEM) characterization was performed on a JEOL 7401-F at 5-10 keV (20 mA) in secondary electron imaging mode with a working distance of 2-8 mm. Transmission electron microscopy (TEM) characterization was performed on a Phillips CM-300FEG electron microscope operated at 300 kV. Samples for TEM were prepared by pulverizing aerogels above TEM grids.

Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 150° C. under vacuum (10$^{-5}$ Torr) for at least 24 hours to remove all adsorbed species.

Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged.

Bulk densities of the samples were determined from the physical dimensions and mass of each sample.

Synthesis of Graphene-Based Aerogel.

The graphene aerogels were prepared using traditional organic sol-gel chemistry. In a typical reaction, graphene oxide (GO) was suspended in deionized water and thoroughly dispersed using a VWR Scientific Model 75T Aquasonic (sonic power ~90 W, frequency ~40 kHz). The concentration of GO in the reaction mixture ranged from 0.1 wt % to 1 wt %. To determine the optimal conditions for GO dispersion, a range of sonication times (4 to 24 hrs) were evaluated. Once the GO was dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol-to-catalyst ratios (R:C) employed was 200. Other catalysts used include ammonium hydroxide, sodium hydroxide, and acetic acid. The amount of resorcinol and formaldehyde (RF solids) ranged from 0-4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical $CO_2$ and pyrolyzed at 1050° C. under a $N_2$ atmosphere for 3 h. The graphene aerogel materials were isolated as black cylindrical monoliths.

Results

Figure 11:
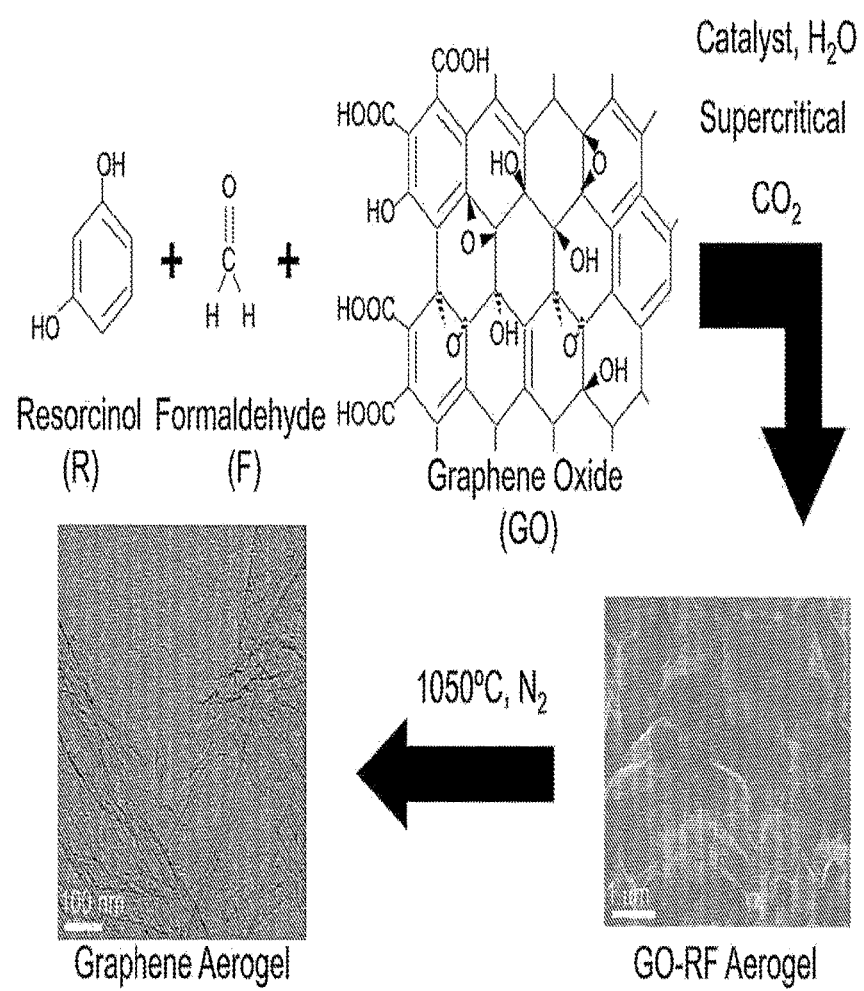
FIG. 11 shows a synthesis scheme for graphene aerogels according to one embodiment of the application.

The synthesis scheme for graphene-based aerogels is depicted in FIG. 11. We have previously shown that gelation of the GO suspension (1 wt %) occurs for an RF solids concentration of 4 wt %. This GO-RF aerogel was thermally reduced to produce the graphene aerogel with the highest reported electrical conductivity. Our objective in this work was the exploration of the limits of this synthesis method and characterization of the resulting materials. In particular, it was of interest to determine the effect of changing the GO and RF concentration.

Figure 12:
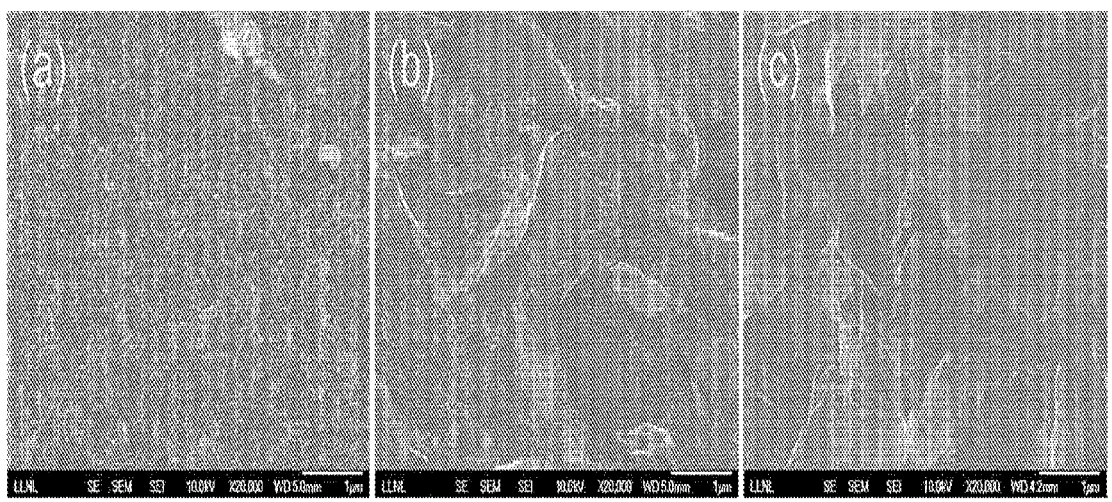
FIG. 12 shows FE-SEM images of the graphene aerogels from 0.1 wt GO suspensions with GO:RF ratios of (a) 0.025, (b) 0.05, and (c) 0.1.

The GO:RF ratio proved to be a critical parameter in determining the microstructure of the monolith. At lower GO:RF ratios (e.g. 0.1 wt % GO, 4 wt % RF), gelation still occurs, but the resulting thermally reduced aerogel no longer resembles a network of graphene sheets. The microstructure resembles that of a pristine carbon aerogel (CA). As the GO:RF ratio is increases (e.g. RF solids lowered to 2 wt %), the graphene network reappears. Further increasing the GO:RF ratio (e.g. RF solids lowered to 1 wt %) yields a microstructure dominated by the graphene network. The evolution of the microstructure, as captured by FE-SEM, can be seen clearly in FIG. 12. The apparent increase in void space observed in FE-SEM with increasing GO:RF ratios is confirmed with a decrease in bulk density from 40 mg/cm$^3$ to 7 mg/cm$^3$.

The dramatic changes in microstructure with GO:RF are correlated with a number of physical properties. Nitrogen porosimetry shows that the surface area and pore volume are fairly constant until a GO:RF ratio of 0.1. When the microstructure becomes completely sheet-like, a large increase in pore volume was observed. The electrical conductivity also exhibits significant correlation with the microstructure. While the electrical conductivity of the aerogels with lower GO:RF ratios (0.025 and 0.05) are identical to that of a pristine CA, the conductivity of the graphene aerogel (GO:RF ratio of 0.1) was twice that of a pristine CA.

The influence of the GO:RF ratio was also investigated at higher GO concentrations (e.g. 1 wt %), but the changes in the properties of the aerogels were much more subtle. The FE-SEM for GO:RF ratios of 0.25 to 1 all looked similar to FIG. 12(c), suggesting the GO:RF ratio of 0.1 is the critical parameter to achieve the sheet-like microstructure. This hypothesis was confirmed by similar nitrogen adsorption/desorption isotherms and electrical conductivities for GO:RF ratios greater than 0.1. One of the more interesting effects observed with increasing GO:RF ratio was a further increase in the internal surface area, which suggests that more single- and few-layer graphene sheets are present at higher GO:RF ratios.

In summary, graphene-based aerogels were fabricated over a range of GO:RF ratios. The GO:RF ratio was shown to be an important parameter in the properties of the final aerogel. The graphene-based aerogels exhibited microstructure and properties similar to pristine CAs until a GO:RF ratio 0.1 is reached. At or above a GO:RF ratio of 0.1, the microstructure and properties of the aerogel are dominated by the graphene. These properties include improved electrical conductivity, high surface areas, and large pore volumes.

Working Example 4

Figure 13:
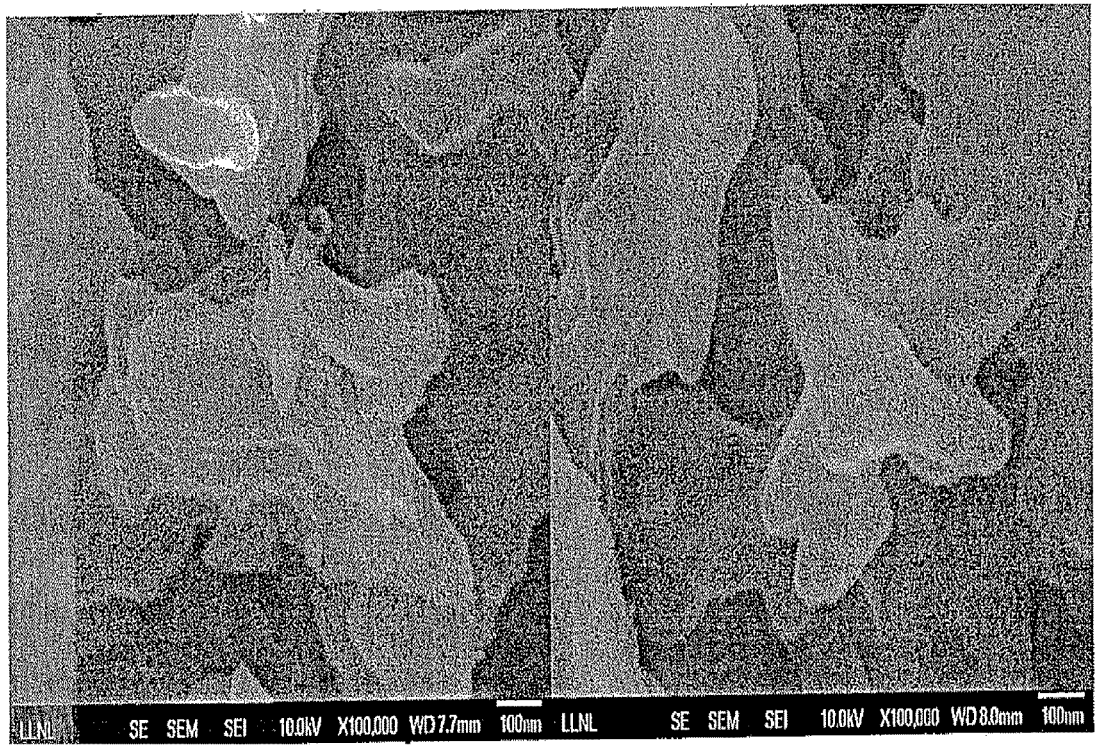
FIG. 13 shows, via SEM images, the effect of activation with carbon dioxide on porosity. The left figure is before activation; the right figure is after activation.

In a typical synthesis, the graphene-doped CA was produced as follows: A suspension of GO in water was made by sonicating 100 mg GO in 10 g water. 1.5 g of the GO suspension was combined with 1.25 g resorcinol, 1.8 g formaldehyde, and 44 microliters acetic acid. The mixture was placed in a sealed vial in an oven at 85° C. overnight to gel. The wet gel then was subjected to solvent exchange in acetone and was dried in air at room temperature. The dried gel was carbonized at 1050° C. in nitrogen to produce the final graphene-doped CA. The final part had a density of approximately 400 mg/cc. After activation in carbon dioxide, the density was approximately 82 mg/cc. Scanning electron microscopy images showed the CA before and after activation (FIG. 13).

Additional Figures

Figure 14:
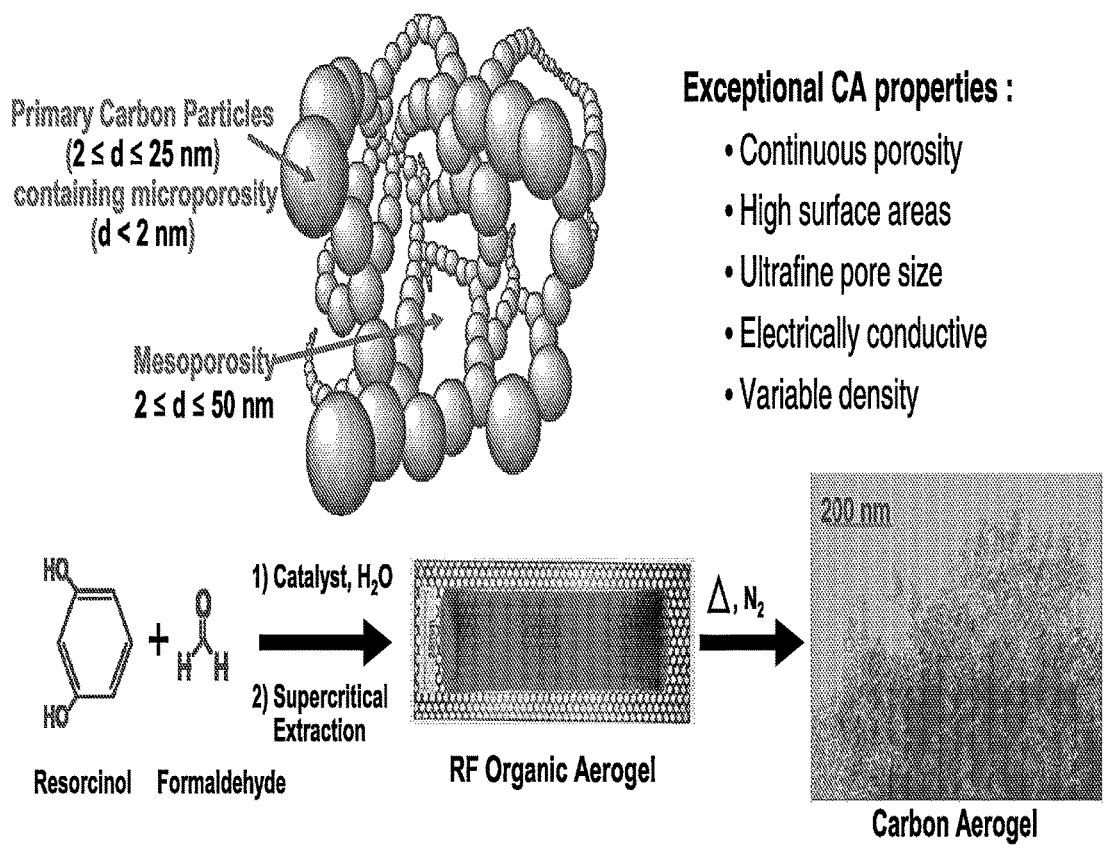
FIG. 14 shows a synthesis scheme for carbon aerogels.

FIG. 14 shows a general scheme for making carbon aerogels using sol-gel process. A carbon aerogel can be a unique porous material comprising a 3D network of interconnected nanometer-sized carbon particles. Carbon aerogels can have many exceptional properties, including continuous porosity, high surface area, ultrafine pore size, electrical conductivity, and variable density. The sol-gel synthesis of carbon aerogel is very flexible, which allows control of pore morphology and addition of nanoparticles (e.g., CNTs, graphene oxide) to the sol-gel reaction.

Figure 15:
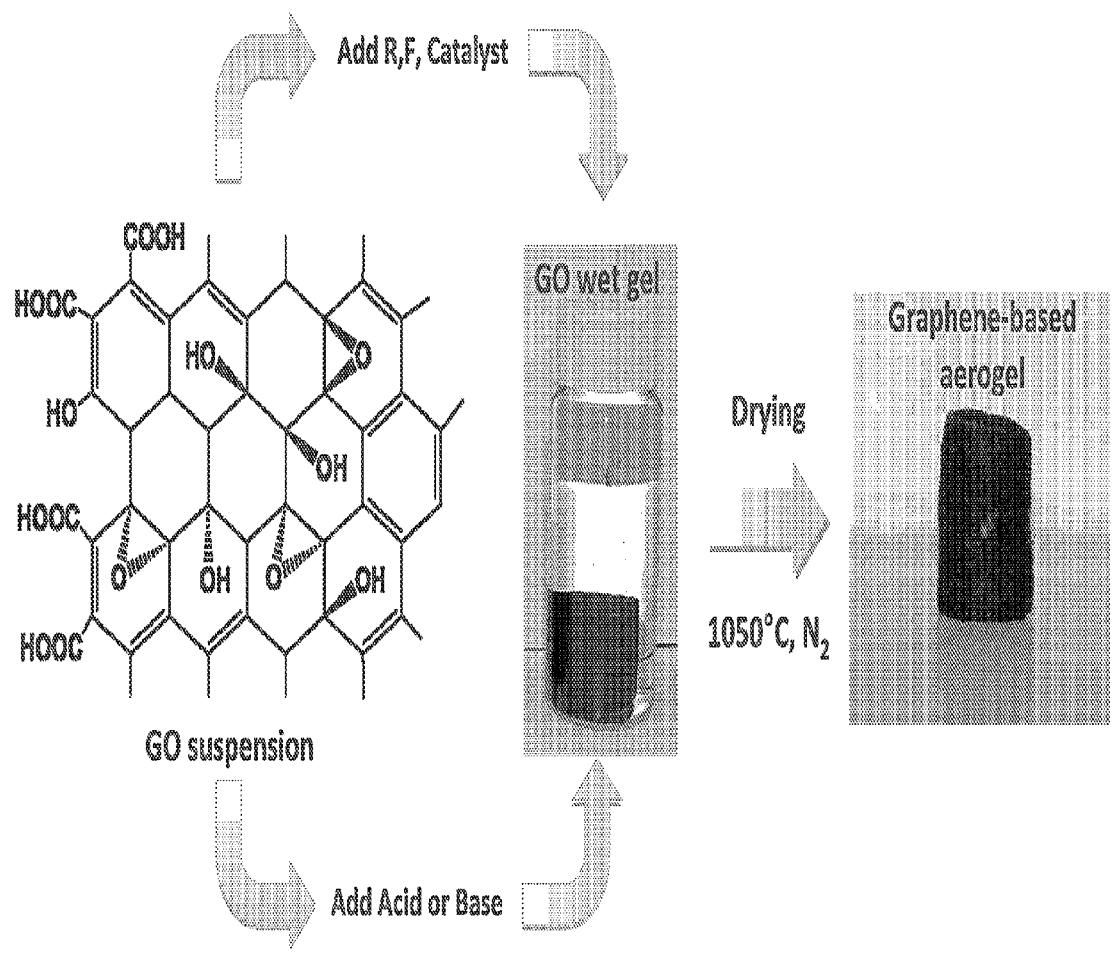
FIG. 15 shows a synthesis scheme for graphene aerogels according to one embodiment.

FIG. 15 shows a general scheme for making graphene aerogel using sol-gel process. Graphene-based materials have many exciting properties, such as high surface area (e.g. 2500 m$^2$/g), low electrical resistivity (e.g. $10^{-6}$ Wcm), large carrier mobility (e.g. $10^5$ cm$^2$V$^{-1}$ s$^{-1}$), and high Young's Modulus (e.g. $10^5$ MPa). Applications of graphene based-materials include single molecule gas sensor, field effect transistors, NEMS (e.g. pressure sensors, resonators), and ultra-capacitors. However, the main focus in the prior art is on individual 2D graphene sheets. A 3D macroscopic graphene network capable of realizing properties of 2D graphene sheets would expand technologies in which graphene would be applicable.

Graphene composites have been described in the prior art. Various agents such as polymers and metal particles have been used to chemically cross-link or functionalize graphene or graphene oxide. Though there are certain improvements in electrical and mechanical properties, those improvement are modest compared to properties of individual 2D graphene sheets.

Graphene assemblies have also been proposed in the prior art. For example, graphene assemblies have been obtained via chemical reduction of graphene oxide suspensions which are freeze-dried or supercritically-dried. In such graphene assemblies, the graphene sheets are mostly connected by physical cross-linking. Though the graphene assemblies show promising electrochemical and catalytic results, they suffer from low conductivity (e.g. $5*10^{-1}$ S/m) and mechanical fragility (e.g. 1 MPa). Moreover, gelation of the graphene assemblies would require high temperature/pressure (e.g. autoclave).

FIG. 16 shows that carbon-nanotubes and graphene aerogels exhibit similar deformation behavior. Moreover, graphene aerogels are stiffer than conventional carbon aerogels with similar densities. Elastic modulus for the graphene aerogel is 50 MPa. Furthermore, graphene aerogels have superelastic behavior, including large (about 50%) elastic strains. Also, inelastic deformation is dominated by ligament fracture.

In summary, 3D graphene structures of present application exhibit high elasticity and stiffness, whereas elastic moduli are order of magnitude higher than previously reported.

FIG. 17 shows a RF-free graphene aerogel made from base-catalyzed GO gelation with excellent properties ($SA_{BET}$~1300 $m^2$/g, σ~$10^2$ S/m, 115 F/g, 8.8 $mF/cm^2$).

The CV plot of the graphene aerogel is close to ideal capacitor behavior at 10 mV/s. Electrical storage capacity can be further improved by optimization.

FIGS. 18-20 shows an activated graphene aerogel made from GO embedded in acid-catalyzed RF, which is dried under ambient condition, carbonized under nitrogen, and activated in CO2. The activated graphene aerogel has a 140% increase in capacitance (gravimetric) as compared to activated carbon aerogel without graphene. Incorporating graphene into carbon aerogel structure provides for more efficient use of surface area for energy storage.

Figure 30:
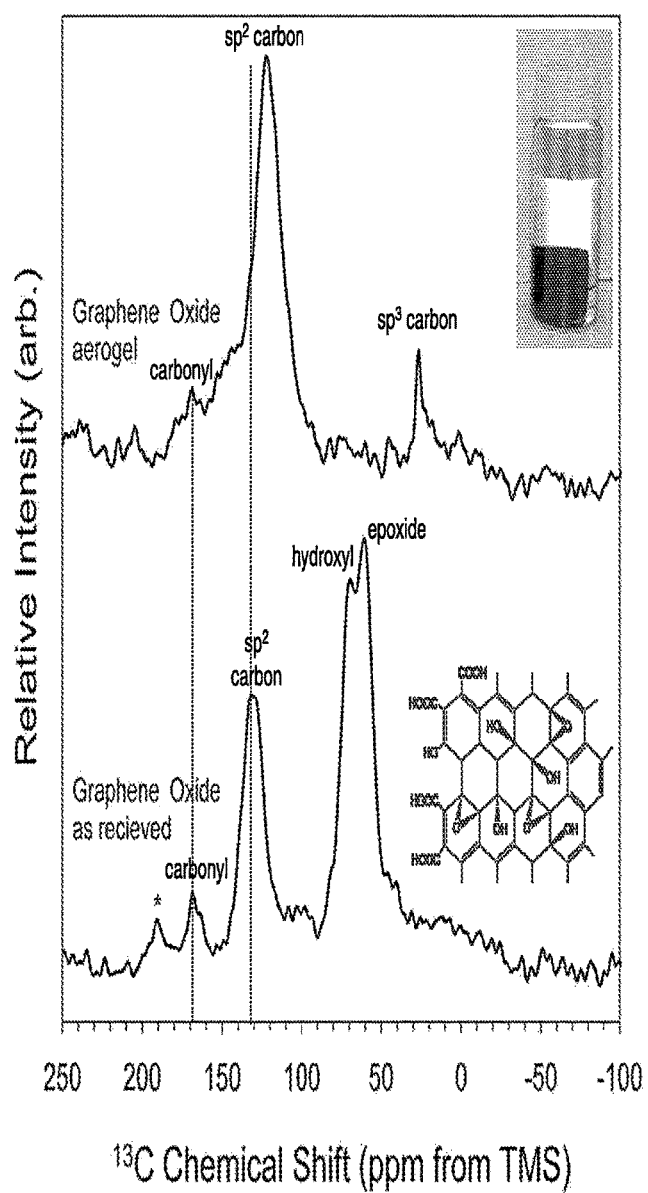
FIG. 30 shows the $^{13}C$ chemical shift of graphene aerogels according to one embodiment as compared to graphene oxide.
Figure 31:
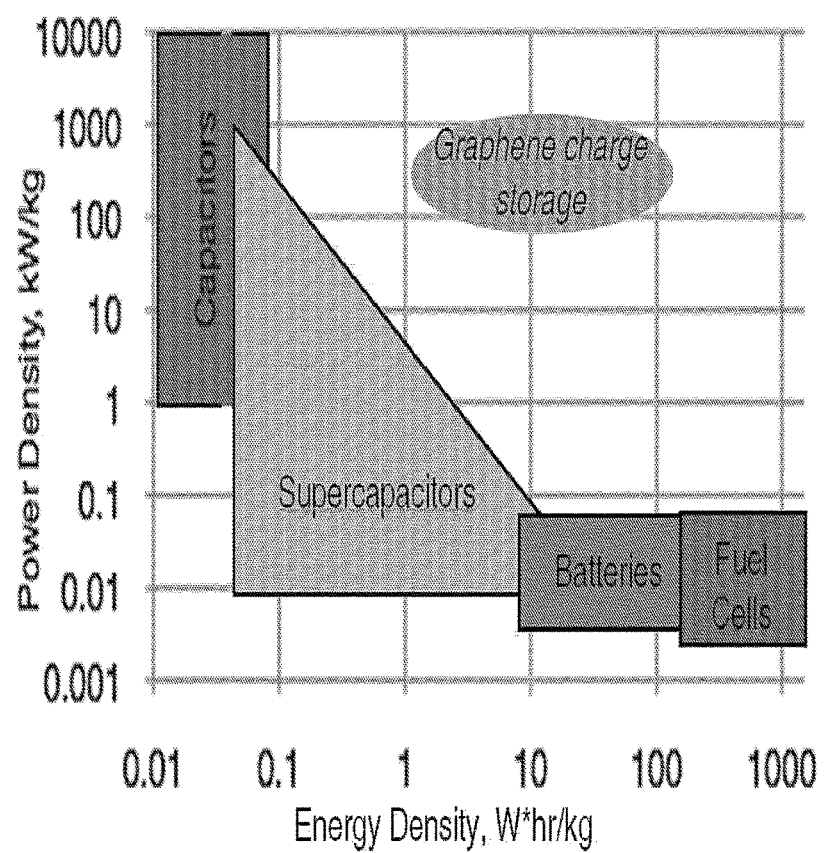
FIG. 31 shows the power density and energy density of graphene aerogel-based devices according to one embodiment of the application as compared to other types of devices. Graphene-based materials will have great impact on charge storage devices

FIG. 30 shows that the chemical crosslinkings between graphene sheets comprise a substantial amount of sp2 bonds. As can be seen from the $^{13}C$ chemical shift data, when GO is converted to a graphene aerogel according to one embodiment, the GO gelation virtually eliminates epoxide and hydroxyl functionalities. Moreover, in this process, the sp2 carbon peak shift; the sp3 carbon peak appears; and the carbonyl carbon peak persists.

In summary, a novel class of 3D macroscopic graphene-based monoliths has been synthesized. The synthesis is a simple process requiring low temperature and pressure. The graphene aerogel monolith is chemical cross-linked by $sp^2$ C bonding. The surface area of the monolith approaches that of 2D graphene sheets (as high as 1500 $m^2$/g). The electrical conductivity of the monolith (~$10^2$ S/m) is orders of magnitude higher than previous graphene-based monoliths. The mechanical property of the monolith (~50 MPa) is order of magnitude higher than previous graphene-based monoliths. The graphene aerogel monolith also has promising capacitive behavior (115 F/g).

CITED REFERENCES (1) Geim, A. K.; Novoselov, K. S. *Nature Materials* 2007, 6, 183.
(2) Gomez-Navarro, C.; Weitz, R. T.; Bittner, A. M.; Scolari, M.; Mews, A.; Burghard, M.; Kern, K. *Nano Letters* 2007, 7, 3499.
(3) Lee, C.; Wei, X.; Kysar, J. W.; Hone, J. *Science* 2008, 321, 385.
(4) Li, X. L.; Zhang, G. Y.; Bai, X. D.; Sun, X. M.; Wang, X. R.; Wang, E.; Dai, H. J. *Nature Nanotechnology* 2008, 3, 538.
(5) Novoselov, K. S.; Geim, A. K.; Morozov, S. V.; Jiang, D.; Zhang, Y.; Dubonos, S. V.; Grigorieva, I. V.; Firsov, A. A. *Science* 2004, 306, 666.
(6) Eda, G.; Fanchini, G.; Chhowalla, M. *Nature Nanotechnology* 2008, 3, 270.
(7) Vivekchand, S. R. C.; Rout, C. S.; Subrahmanyam, K. S.; Govindaraj, A.; Rao, C. N. R. *Journal of Chemical Sciences* 2008, 120, 9.
(8) Vollmer, a.; Feng, X. L.; Wang, X.; Zhi, L. J.; Mullen, K.; Koch, N.; Rabe, J. P. *Applied Physics a-Materials Science & Processing* 2009, 94, 1.
(9) Wang, X.; Zhi, L. J.; Mullen, K. *Nano Letters* 2008, 8, 323.
(10) Yoo, E.; Kim, J.; Hosono, E.; Zhou, H.; Kudo, T.; Honma, I. *Nano Letters* 2008, 8, 2277.
(11) Sutter, P. W.; Flege, J. I.; Sutter, E. A. *Nature Materials* 2008, 7, 406.
(12) Tang, Z. H.; Shen, S. L.; Zhuang, J.; Wang, X. *Angewandte Chemie-International Edition* 2010, 49, 4603.
(13) Fowler, J. D.; Allen, M. J.; Tung, V. C.; Yang, Y.; Kaner, R. B.; Weiller, B. H. *ACS Nano* 2009, 3, 301.
(14) Schedin, F.; Geim, A. K.; Morozov, S. V.; Hill, E. W.; Blake, P.; Katsnelson, M. I.; Novoselov, K. S. *Nature Materials* 2007, 6, 652.
(15) Yuyan, S.; Jun, W.; Hong, W.; Jun, L.; Ilhant, A. A.; Yuehe, L. *Electroanalysis,* 22, 1027.
(16) Ramanathan, T.; Abdala, A. A.; Stankovich, S.; Dikin, D. A.; Herrera-Alonso, M.; Piner, R. D.; Adamson, D. H.; Schniepp, H. C.; Chen, X.; Ruoff, R. S.; Nguyen, S. T.; Aksay, I. A.; Prud'homme, R. K.; Brinson, L. C. *Nature Nanotechnology* 2008, 3, 327.
(17) Stankovich, S.; Dikin, D. A.; Dommett, G. H. B.; Kohlhaas, K. M.; Zimney, E. J.; Stach, E. A.; Piner, R. D.; Nguyen, S. T.; Ruoff, R. S. *Nature* 2006, 442, 282.
(18) Verdejo, R.; Barroso-Bujans, F.; Rodriguez-Perez, M. A.; de Saja, J. A.; Lopez-Machado, M. A. *Journal of Materials Chemistry* 2008, 18, 2221.
(19) Cote, L. J.; Cruz-Silva, R.; Huang, J. *Journal of the American Chemical Society* 2009, 131, 11027.
(20) Vickery, J. L.; Patil, A. J.; Mann, S. *Advanced Materials* 2009, 21, 2180.
(21) Liu, F.; Seo, T. S. *Advanced Functional Materials* 2010, 20, 1930.
(22) Wang, J.; Ellsworth, M. *ECS Transactions* 2009, 19, 241.
(23) Xu, Y.; Sheng, K.; Li, C.; Shi, G. *ACS Nano* 2010, 4, 4324.
(24) Zu, S. Z.; Han, B. H. *Journal of Physical Chemistry C* 2009, 113, 13651.
(25) Wu, Z.-S.; Ren, W.; Gao, L.; Zhao, J.; Chen, Z.; Liu, B.; Tang, D.; Yu, B.; Jiang, C.; Cheng, H.-M. *ACS Nano* 2009, 3, 411.
(26) Worsley, M. A.; Kucheyev, S. O.; Satcher, J. H.; Hamza, A. V.; Baumann, T. F. *Applied Physics Letters* 2009, 94, 073115.
(27) Pekala, R. W.; Kong, F. M. *Abstracts of Papers of the American Chemical Society* 1989, 197, 113.
(28) Hummers, W.; Offman, R. *J. Am. Chem. Soc.* 1958, 80, 1339.
(29) McAllister, M. J.; Li, J. L.; Adamson, D. H.; Schniepp, H. C.; Abdala, A. A.; Liu, J.; Herrera-Alonso, M.; Milius, D. L.; Car, R.; Prud'homme, R. K.; Aksay, I. A. *Chemistry of Materials* 2007, 19, 4396.
(30) Worsley, M. A.; Pauzauskie, P. J.; Kucheyev, S. O.; Zaug, J. M.; Hamza, A. V.; Satcher, J. H.; Baumann, T. F. *Acta Materialia* 2009, 57, 5131.
(31) Peigney, A.; Laurent, C.; Flahaut, E.; Bacsa, R. R.; Rousset, A. *Carbon* 2001, 39, 507.

(32) Balandin, A. A.; Ghosh, S.; Bao, W. Z.; Calizo, I.; Teweldebrhan, D.; Miao, F.; Lau, C. N. Superior Thermal Conductivity of Single-Layer Graphene *Nano Letters* 2008, 8, 902-907.
(33) Ghosh, S.; Calizo, I.; Teweldebrhan, D.; Pokatilov, E. P.; Nika, D. L.; Balandin, A. A.; Bao, W.; Miao, F.; Lau, C. N. Extremely High Thermal Conductivity of Graphene: Prospects for Thermal Management Applications in Nanoelectronic Circuits *Appl Phys Lett* 2008, 92, -.
(34) Hwang, E. H.; Adam, S.; Das Sarma, S. Carrier Transport in Two-Dimensional Graphene Layers *Phys Rev Lett* 2007, 98, -.
(35) Morozov, S. V.; Novoselov, K. S.; Katsnelson, M. I.; Schedin, F.; Elias, D. C.; Jaszczak, J. A.; Geim, A. K. Giant Intrinsic Carrier Mobilities in Graphene and Its Bilayer *Phys Rev Lett* 2008, 100, -.
(36) Al-Muhtaseb, S. A.; Ritter, J. A. Preparation and Properties of Resorcinol-Formaldehyde Organic and Carbon Gels *Adv Mater* 2003, 15, 101-114.
(37) Takai, K.; Oga, M.; Sato, H.; Enoki, T.; Ohki, Y.; Taomoto, A.; Suenaga, K.; Iijima, S. Structure and Electronic Properties of a Nongraphitic Disordered Carbon System and Its Heat-Treatment Effects *Physical Review B* 2003, 67, -.
(38) Ferrari, a. C.; Meyer, J. C.; Scardaci, V.; Casiraghi, C.; Lazzeri, M.; Mauri, F.; Piscanec, S.; Jiang, D.; Novoselov, K. S.; Roth, S.; Geim, A. K. Raman Spectrum of Graphene and Graphene Layers *Phys Rev Lett* 2006, 97, -.
(39) Graf, D.; Molitor, F.; Ensslin, K.; Stampfer, C.; Jungen, A.; Hierold, C.; Wirtz, L. Spatially Resolved Raman Spectroscopy of Single- and Few-Layer Graphene *Nano Letters* 2007, 7, 238-242.
(40) Ferrari, a. C.; Robertson, J. A. G. Interpretation of Raman Spectra of Disordered and Amorphous Carbon *Physical Review B* 2000, 61, 14095-14107.
(41) Baldan, R. R.; Almeida, E. C.; Azevedo, A. F.; Goncalves, E. S.; Rezende, M. C.; Ferreira, N. G. Raman Validity for Crystallite Size La Determination on Reticulated Vitreous Carbon with Different Graphitization Index *Applied Surface Science* 2007, 254, 600.
(42) Stöhr, J. *Nexafs Spectroscopy*; Springer-Verlag: Berlin—Heidelberg—New York, 1992.
(43) Ma, Y.; Skytt, P.; Wassdahl, N.; Glans, P.; Mancini, D. C.; Guo, J.; Nordgren, J. Core Excitons and Vibronic Coupling in Diamond and Graphite *Phys. Rev. Lett.* 1993, 71, 3725-3728.
(44) Kuhn, J.; Brandt, R.; Mehling, H.; Petricevic, R.; Fricke, J. In Situ Infrared Observation of the Pyrolysis Process of Carbon Aerogels *Journal of Non-Crystalline Solids* 1998, 225, 58-63.
(45) Jeong, H.-K.; Noh, H.-J.; Kim, J.-Y.; Jin M. H.; Park, C. Y.; Lee, Y. H. X-ray Absorption Spectroscopy of Graphite Oxide *Europhysics Letters* 2008, 82, 67004-1-5
(46) Jeong, H.-K.; Noh, H.-J.; Kim, J.-Y.; Glans, P.-A.; Jin, M.-H.; Smith, K. E.; Lee, Y. H. Comment on "Near-Edge X-Ray Absorption Fine-Structure Investigation of Graphene" *Physical Review Letters* 2009, 102, 099701
(47) Pacilé, D.; Papagno, M.; Fraile Rodríguez, A.; Grioni, M.; Papagno, L.; Girit, Ç. Ö.; Meyer J. C.; Begtrup, G. E.; Zettl, A. Near-Edge X-Ray Absorption Fine-Structure Investigation of Graphene *Physical Review Letters* 2008, 101, 066806
(48) Pacilé, D.; Papagno, M.; Fraile Rodríguez, A.; Grioni, M.; Papagno, L.; Girit, Ç. Ö; Meyer J. C.; Begtrup, G. E.; Zettl, A. Reply to Comment on "Near-Edge X-Ray Absorption Fine-Structure Investigation of Graphene" *Physical Review Letters* 2009, 102, 099702
(49) Lu, X. P.; Nilsson, O.; Fricke, J.; Pekala, R. W. Thermal and Electrical-Conductivity of Monolithic Carbon Aerogels *Journal of Applied Physics* 1993, 73, 581-584.
(50) Batson, P. E. Carbon-1s near-Edge-Absorption Fine-Structure in Graphite *Phys. Rev. B* 1993, 48, 2608-2610.
(51) Gregg, S. J.; Sing, K. S. W. *Adsorption, Surface Area and Porosity,* 2nd ed.; Academic: London, 1982.

What is claimed is:

1. A method comprising: preparing a reaction mixture comprising a graphene oxide (GO) suspension and at least one catalyst; curing the reaction mixture to produce a wet gel; drying the wet gel to produce a dry gel; and pyrolyzing the dry gel to produce a graphene aerogel.

2. The method of claim 1, wherein the GO suspension is an aqueous suspension or a suspension in at least one organic solvent.

3. The method of claim 1, wherein the reaction mixture comprise a GO concentration of 2 mg/cc or more.

4. The method of claim 1, wherein the reaction mixture comprises resorcinol and formaldehyde.

5. The method of claim 1, wherein the reaction mixture is free of resorcinol and formaldehyde.

6. The method of claim 1, wherein the reaction mixture comprises resorcinol and formaldehyde, and wherein the weight/weight ratio of GO/(resorcinol and formaldehyde) is 0.1 or more.

7. The method of claim 1, wherein the reaction mixture is cured at a temperature of 100° C. or less.

8. The method of claim 1, wherein the reaction mixture is cured at atmospheric pressure.

9. The method of claim 1, wherein the step of drying the wet gel comprises solvent exchange.

10. The method of claim 1, wherein the step of drying the wet gel comprises drying the wet gel with supercritical $CO_2$.

11. The method of claim 1, wherein the step of pyrolyzing the dry gel comprises drying the dry gel in an inert atmosphere at a temperature of 500° C. or higher.

12. The method of claim 1, further comprising thermally activating the graphene aerogel in an oxidizing atmosphere to produce an activated graphene aerogel.

13. The method of claim 1, further comprising thermally activating the graphene aerogel in $CO_2$ to produce an activated graphene aerogel, wherein the reaction mixture comprises an acid catalyst, resorcinol and formaldehyde, and wherein the activated graphene aerogel has a surface area of 2500 m/g or more and a capacity of 200 F/g or more.

14. The method of claim 1, wherein the reaction mixture comprises a base catalyst and is free of resorcinol and formaldehyde, and wherein without thermal activation the graphene aerogel has a surface area of 1,000 m/g or more and a capacity of 100 F/g or more.

* * * * *